US011565562B2

(12) United States Patent
Starik et al.

(10) Patent No.: US 11,565,562 B2
(45) Date of Patent: Jan. 31, 2023

(54) VEHICLE SUSPENSION SYSTEM

(71) Applicant: REE Automotive Ltd., Kibbutz Glil-Yam (IL)

(72) Inventors: Eran Starik, Tel Aviv (IL); Eylon Avigur, Ramat Gan (IL)

(73) Assignee: REE AUTOMOTIVE LTD., Kibbutz Glil-Yam (IL)

(*) Notice: Subject to any disclaimer, the term of this patent is extended or adjusted under 35 U.S.C. 154(b) by 0 days.

(21) Appl. No.: 17/633,863

(22) PCT Filed: Oct. 13, 2021

(86) PCT No.: PCT/IL2021/051219
§ 371 (c)(1),
(2) Date: Feb. 8, 2022

(87) PCT Pub. No.: WO2022/079716
PCT Pub. Date: Apr. 21, 2022

(65) Prior Publication Data
US 2022/0339984 A1 Oct. 27, 2022

(30) Foreign Application Priority Data
Oct. 14, 2020 (IL) .......................................... 278056

(51) Int. Cl.
*B60G 3/20* (2006.01)
*B60G 7/00* (2006.01)
(Continued)

(52) U.S. Cl.
CPC ............... *B60G 3/20* (2013.01); *B60G 7/001* (2013.01); *B60G 13/005* (2013.01); *B60K 7/0007* (2013.01); *B60G 2202/312* (2013.01)

(58) Field of Classification Search
CPC ........ B60G 3/20; B60G 7/001; B60G 13/005; B60G 2202/312; B60K 7/0007
See application file for complete search history.

(56) References Cited

U.S. PATENT DOCUMENTS 6,293,561 B1 * 9/2001 Goetzen ................. B62D 17/00
280/86.757
9,172,287 B2 * 10/2015 Fofonoff .................. H02K 7/06
(Continued)

OTHER PUBLICATIONS

Written Opinion for International Application No. PCT/IL2021/051219, dated Jan. 18, 2022 (4 pages).
(Continued)

*Primary Examiner* — Darlene P Condra
(74) *Attorney, Agent, or Firm* — Brown Rudnick LLP

(57) ABSTRACT

A suspension system including a Chebyshev-Lambda (CL) mechanism, at least one linear motion mechanism and a spring-damper assembly, the CL mechanism including a suspension-arm, a support-arm and a first rotating-arm, an end of the rotating-arm being configured to be coupled with a reference frame at an anchoring-node, an operational-end of the suspension-arm being configured to be coupled with a suspended-mount at a first node, an end of the support-arm being configured to be coupled with the reference frame at a support-anchoring-node, the linear motion mechanism configured to be coupled with the reference frame via at least one anchoring node, an end of the linear motion mechanism being configured to be coupled with the suspended-mount at a second node, and the spring-damper assembly including at least one spring and at least one damper, wherein respective first and second ends of the spring and the damper are coupled between two points.

19 Claims, 22 Drawing Sheets

(51) Int. Cl.
*B60K 7/00* (2006.01)
*B60G 13/00* (2006.01)

(56) References Cited

U.S. PATENT DOCUMENTS

| 2009/0140503 | A1* | 6/2009 | Kolesar | B61B 11/008 |
| | | | | 104/173.2 |
| 2017/0327207 | A1* | 11/2017 | Sierra | B60G 3/20 |
| 2018/0072125 | A1* | 3/2018 | Hunter | B60G 3/20 |

OTHER PUBLICATIONS

International Search Report for International Application No. PCT/IL2021/051219, dated Jan. 18, 2022 (2 pages).
Barias, Firat. "Design of a Mars rover suspension mechanism." Master's thesis, Izmir Institute of Technology, 2004 (93 pages).

* cited by examiner

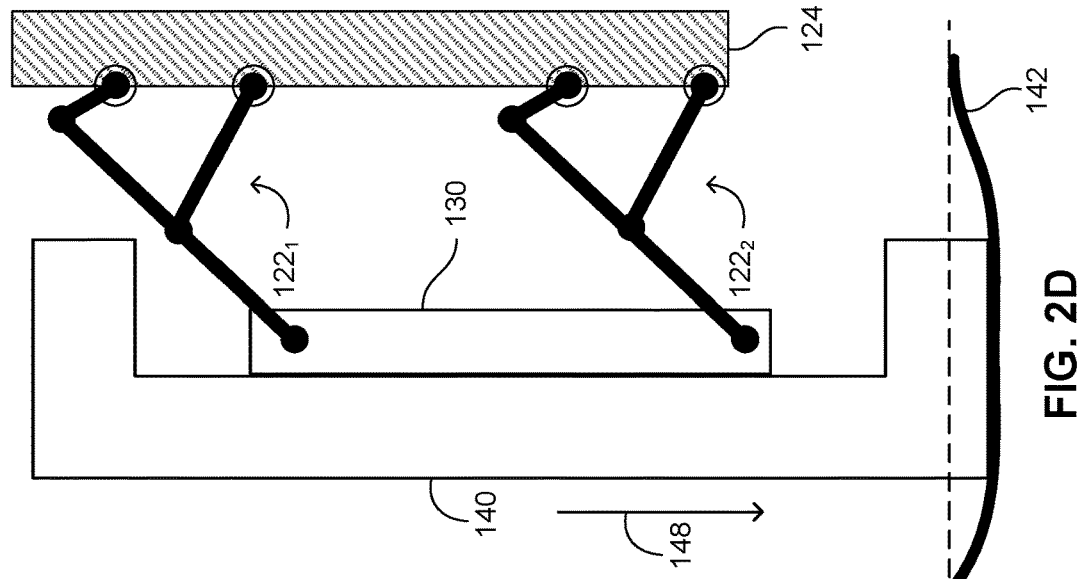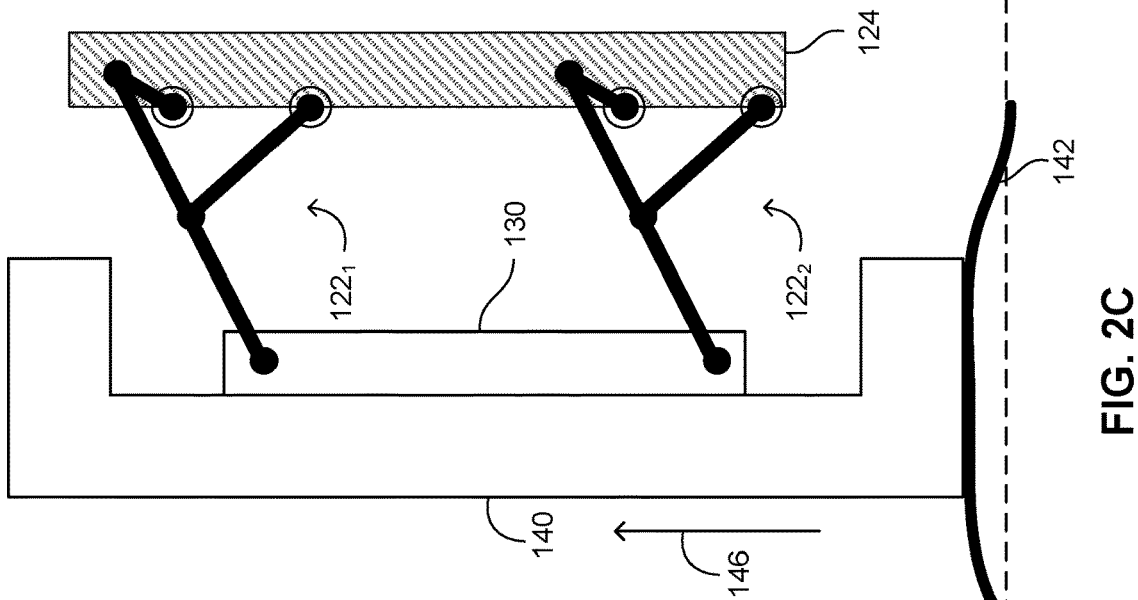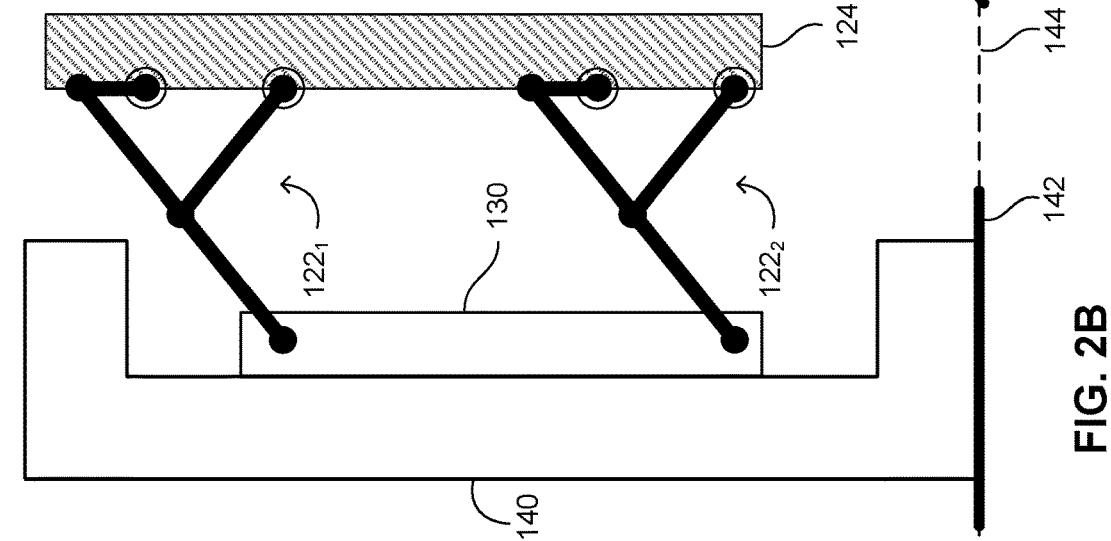

VEHICLE SUSPENSION SYSTEM

CROSS-REFERENCE TO RELATED APPLICATIONS

The present application is a national stage entry of PCT/IL2021/051219 which has an International Filing Date of Oct. 13, 2021. PCT/IL2021/051219 claims the benefit of and priority to Israel Patent Application No. 278056 which was filed at the patent office in Israel on Oct. 14, 2020. The entire contents of each of PCT/IL2021/051219 and IL 278056 are incorporated herein by reference.

FIELD OF THE DISCLOSED TECHNIQUE

The disclosed technique relates to vehicles in general, and to suspension and steering systems in particular.

BACKGROUND OF THE DISCLOSED TECHNIQUE

Suspension systems for vehicles are in known the art. In wheeled vehicles, such systems connect a vehicle chassis with a wheel or wheels, but also enable relative motion between the wheel and the chassis at least in the vertical axis of the vehicle. A suspension system aims to maintain contact with the road and to reduce shocks and impacts transferred to the chassis from the wheel. Known in the art suspension systems includes springs (e.g., leaf springs, coil springs, torsion bars) and shock absorbers, which are coupled with linkages between the wheel and the chassis of the vehicle.

Transverse suspension systems are widely used in vehicles. Some current transverse suspension systems may provide independent suspension for each of the wheels of the vehicle. One example of a known in the art transverse suspension system is a double wishbone suspension system. The double wishbone suspension system includes two wishbone arms, each pivotally coupled at one end thereof to a reference frame of a vehicle, employing two pivoting connections. The other end of each wishbone arm is coupled with wheel interface using one pivoting connection. Another example of known in the art transverse suspension system is a MacPherson strut suspension system. The MacPherson strut suspension system includes a single wishbone arm and a telescopic shock absorber which is also used as a steering pivot.

SUMMARY OF THE PRESENT DISCLOSED TECHNIQUE

It is an object of the disclosed technique to provide a novel suspension system. In accordance with the disclosed technique, there is thus provided a suspension system including a Chebyshev-Lambda mechanism, at least one linear motion mechanism and a spring-damper assembly. The Chebyshev-Lambda mechanism includes suspension-arm, a support-arm and a first rotating-arm. A rotating-arm-anchoring-end of the rotating-arm is configured to be rotatably coupled with a reference frame at a rotating-arm-anchoring-node. An operational-end of the suspension-arm is configured to be rotatably coupled with a surface-contact-element-suspended-mount at an operational-node. A support-arm-anchoring-end of the support-arm is configured to be rotatably coupled with the reference frame at a support-anchoring-node. The at least one linear motion mechanism is configured to be coupled with the reference frame via at least one anchoring node. An operational end of the at least one linear motion mechanism is configured to be rotatably coupled with the surface contact element suspended mount at a second operational node. The spring-damper assembly includes at least one spring and at least one damper. The ends of each of the at least one spring and at least one damper are coupled between two points, where the distance between the two points changes during the motion action of the surface contact element.

In accordance with another aspect of the disclosed technique, there is thus provided a suspension system including a first Chebyshev-Lambda mechanism a second Chebyshev-Lambda mechanism and a spring-damper assembly. Each of the first Chebyshev-Lambda mechanism and the second Chebyshev-Lambda mechanism includes a respective suspension-arm, a respective support-arm and a respective rotating-arm. A rotating-arm-anchoring-end of each of the respective rotating-arm is configured to be rotatably coupled with a reference frame at a respective rotating-arm-anchoring-node. An operational-end of each the respective suspension-arm is configured to be rotatably coupled with a surface-contact-element-suspended-mount at a respective operational-node. A support-arm-anchoring-end of each the respective support-arm is configured to be rotatably coupled with the reference frame at a respective support-anchoring-node. The spring-damper assembly includes at least one spring and at least one damper. The ends of each of the at least one spring and at least one damper are coupled between two points, where the distance between the two points changes during the motion action of the surface contact element.

BRIEF DESCRIPTION OF THE DRAWINGS

The disclosed technique will be understood and appreciated more fully from the following detailed description taken in conjunction with the drawings in which:

FIGS. 2A, 2B, 2C, and 2D are schematic illustrations of a suspension system constructed and operative in accordance with an embodiment of the disclosed technique;

DETAILED DESCRIPTION OF THE EMBODIMENTS

Figure 1A:
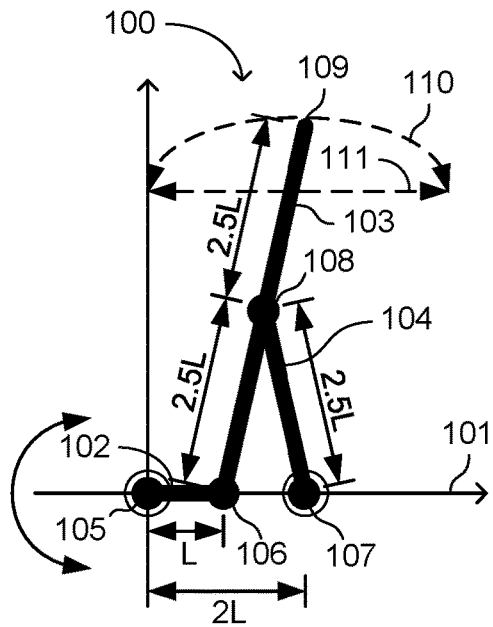
FIGS. 1A, 1B, 1C, and 1D are schematic illustrations of Chebyshev-Lambda mechanism.
Figure 1B:
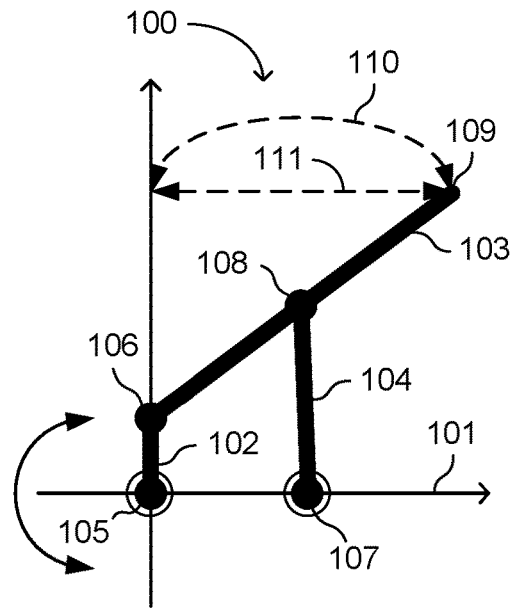
Figure 1C:
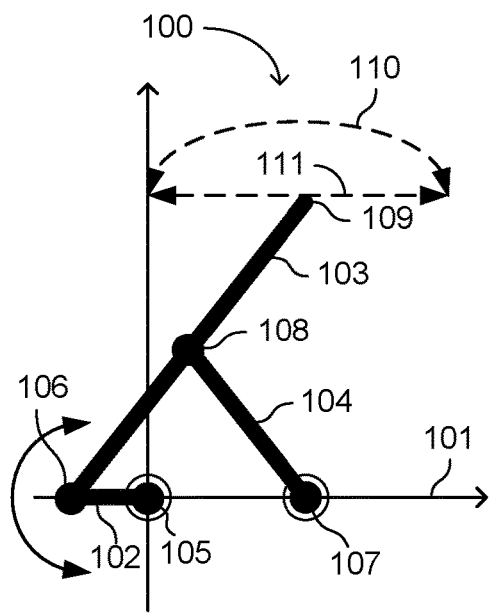
Figure 1D:
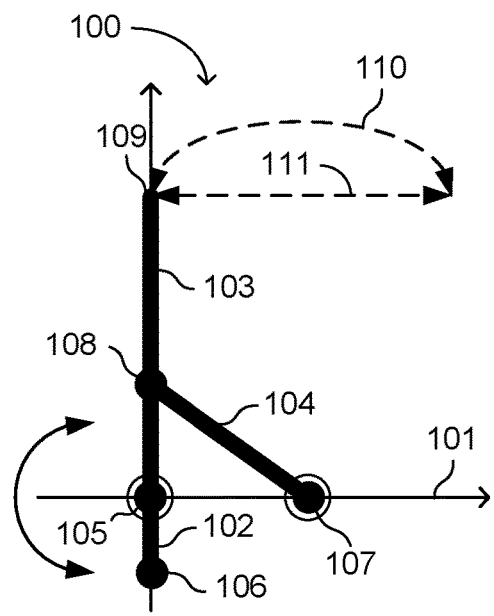

The disclosed technique overcomes the disadvantages of the prior art by providing a suspension system for a vehicle, which employs one or more Chebyshev-Lambda mechanisms (also known as Hoekens mechanism). The one or more Chebyshev-Lambda mechanisms are arranged to operate in the respective linear ranges thereof. When two or more Chebyshev-Lambda mechanisms are employed, these mechanisms are arranged vertically one with respect to the other (i.e., along a vertical axis) and can each be transverse with respect to a wheel hub rotation axis as well as non-transverse to such a rotation axis. The operational end of each Chebyshev-Lambda mechanism is configured to be coupled with a suspended mount (i.e., a frame on which the wheel is mounted). In a suspension system according to the disclosed technique, the suspension system operates independently of any suspension systems in the vehicle. Chebyshev-Lambda mechanisms are typically employed in the constructions of biomimetic mechanical machines (e.g., machines which mimic a walking creature). Unlike biomimetic machines, where the operational end is typically the output of the Chebyshev-Lambda mechanism, in a suspension system according to the disclosed technique the operational end of each of the Chebyshev-Lambda mechanisms may be regarded as "the motion input" to the suspension system. According to the disclosed technique, a steering mechanism is optionally employed in conjunction with the suspension system as further elaborated below. In the explanations which follow, the plane over which a vehicle maneuvers, is referred to herein as a "horizontal plane" and an axis perpendicular to such a horizontal plane, is referred to herein as a "vertical axis". When the vehicle is a wheeled vehicle, the "horizontal plan" may be the plane (e.g., terrain) over which a wheel rolls. The terms "vertical motion" and "motion in the vertical direction", relate herein to motion along a vertical axis as per the definition thereof above. Also, the term "in-motion axis" relates to an axis pointing in a direction along which the wheel rolls (i.e., the in-motion direction, e.g. longitudinal direction of the vehicle). Typically, the in-motion axis is parallel (or substantially parallel, for example, when wheel has a camber angle) to the horizontal plane. The term "lateral axis" relates to an axis perpendicular (or substantially perpendicular) to both the vertical axis and the in-motion axis, pointing in a direction perpendicular to the direction toward which the wheel rolls (i.e., lateral direction). Also, the terms "coupled at pivot point", "pivotally coupled", "coupled at rotation point" and "rotatably coupled" are all employed herein interchangeably and relate to two elements coupled such that these two elements may rotate one with respect to the other.

Reference is now made to FIGS. 1A, 1B, 1C, and 1D which are schematic illustrations of Chebyshev-Lambda mechanism, generally referenced 100. Chebyshev-Lambda mechanism 100 includes a rotating arm 102, a suspension arm 103 and a support arm 104. In the above example of biomimetic machines, a rotating arm such as rotating arm 102 may also be referred to as an input arm, and a suspension arm such as suspension arm 103 may also be referred to as an actuation arm or an output arm.

A rotating arm anchoring end of rotation arm 102 is rotatably coupled with a reference frame 101 at a rotating arm anchoring node 105, such that rotating arm 102 is operative to rotate about rotating arm anchoring node 105. The location of rotating arm anchoring node 105 is fixed in reference frame 101 (i.e., indicated by the double circle). A rotating arm motion end of rotating arm 102 is rotatably coupled with a suspension arm motion end of suspension arm 103 at rotating node 106, such that rotating arm 102 and suspension arm 103 are operative to rotate one with respect to other about rotating node 106. A support arm anchoring end of support arm 104 is rotatably coupled with reference frame 101 at a support anchoring node 107, such that support arm 104 is operative to rotate about support anchoring node 107. The location of support anchoring node 107 is fixed in reference frame 101 (i.e., indicated by the double circle). A support arm motion end of support arm 104 is rotatably coupled with suspension arm 106 at support node 108, such suspension arm 103 and support arm 104 are operative to rotate one with respect to the other about support node 108.

For a given length, L, of rotating arm 102, the length of suspension arm 103 is 5*L and the length of support arm 104 is 2.5*L. Also, the distance between pivot point 105 and pivot point 107 is 2*L, and the distance between pivot point 106 and pivot point 108 is 2.5*L (i.e., pivot point 108 is located at the middle of suspension arm 103) regardless of the angular position of rotating arm 102.

In the example brought forth in FIGS. 1A-1D, the vertical axis represents the angle of 0 degrees(0°) and 180 degrees (180°), where the angles increase in a counterclockwise direction. As rotating arm 102 rotates from 0° degrees, through 90° degrees to 180° (FIGS. 1B and 1C), a second end 109 of suspension arm 103 traces a straight line as indicated by double arrowed dashed line 111. As rotating arm 102 rotates from 180° degrees, through 270° degrees to 180° (FIGS. 1D and 1A), second end 109 of suspension arm 103 traces an arc as indicated by double arrowed dashed arc 110.

A second end of a first arm linkage (e.g., second end 109 of suspension arm 103) of a Chebyshev-Lambda mechanism shall be referred to herein as an 'operational end'. Also, the angular range through which a rotating arm (e.g., rotating arm 102) of a Chebyshev-Lambda mechanism rotates, and the operational end traces a straight line, is referred to herein as 'the linear range'.

Reference is now made to FIGS. 2A, 2B, 2C, and 2D, which are schematic illustrations of a suspension system generally referenced 120, constructed and operative in accordance with an embodiment of the disclosed technique. The description of suspension system 120 brought herein in conjunction with FIGS. 2A-2D relates to aspects of the disclosed technique which apply to any of the embodiments described herein in conjunction with FIGS. 1A-1D, 3A-3E, 4A-4D, 5A-5B, 6A-6B, 7, 8, 9, 10 or 11. Suspension system 120 includes two Chebyshev-Lambda mechanisms, a first Chebyshev-Lambda mechanism $122_1$ and a second Chebyshev-Lambda mechanism $122_2$, each operating within the respective linear range thereof. Suspension system 120 further includes a spring-damper 136. Each one of first Chebyshev-Lambda mechanism $122_1$ and second Chebyshev-Lambda mechanism $122_2$ is coupled with a reference frame 124 (i.e., at the anchoring nodes indicated by double circles). Reference frame 124 is, for example, a chassis of a vehicle, or a frame of an assembly (e.g., a wheel assembly or corner assembly) attachable to a chassis.

First Chebyshev-Lambda mechanism $122_1$ is coupled with reference frame 124 at rotating arm anchoring node $126_1$ and support anchoring node $128_1$. Second Chebyshev-Lambda mechanism $122_2$ is coupled with frame 124 at rotating arm anchoring node $106_2$ and support anchoring node $128_2$. Also, the operational ends of each one of first Chebyshev-Lambda mechanism $122_1$ and second Chebyshev-Lambda mechanism $122_2$ are rotatably coupled, for example with a suspended mount 130, at operational nodes $132_1$ and $132_2$ respectively. Thus, suspended mount 130 is free to move in a straight line in the vertical axis, as indicated by arrow 134, and relative to reference frame 124.

Spring-damper 136 (e.g., coil over) may be rotatably coupled with one of Chebyshev-Lambda mechanisms $122_1$ and $122_2$ at a selected point (i.e., either directly or mechanical energy transfer elements such as rockers or rods), which moves with motion of suspended mount 130. In the example brought forth in FIG. 2A, one end of damper 136 is rotatably coupled with second Chebyshev-Lambda mechanism $122_2$ at rotating node $127_2$ such that spring-damper 136 is free to rotate about rotating node $127_2$. The other end of spring-damper 136 is rotatably coupled with reference frame 124 at pivot point 138, such that spring-damper 136 is free to rotate about pivot point 138. Thus, any vertical motion of suspended mount 130, and thus of the operational end of second Chebyshev-Lambda mechanism $122_2$ is transferred to spring-damper 136, which reduces the shocks and impacts transferred to reference frame 124 from the wheel.

With reference to FIGS. 2B-2D, suspension system 120 is depicted with a wheel 140 mounted on suspended mount 130, rolling over a road 142 at three different instances. Wheel 140 rotates relative suspended mount 130 about in-motion axis. For the sake of clarity, spring-damper 136 has been omitted from FIGS. 2B-2D. With reference to FIG. 2B road 142 is even as wheel 140 rolls there over. In FIGS. 2B and 2C road 142 defines a horizontal plane indicated by dashed line 144. With reference to FIG. 2C, road 142 includes a protrusion (i.e., a "bump") relative to horizontal plane 144. Consequently, wheel 140 moves "up" in the vertical axis, as indicated by arrow 146. With reference to FIG. 2D, road 142 includes a depression relative to horizontal plane 144. Consequently, wheel 140 moves "down" in the vertical axis, as indicated by arrow 148.

Figure 2A:
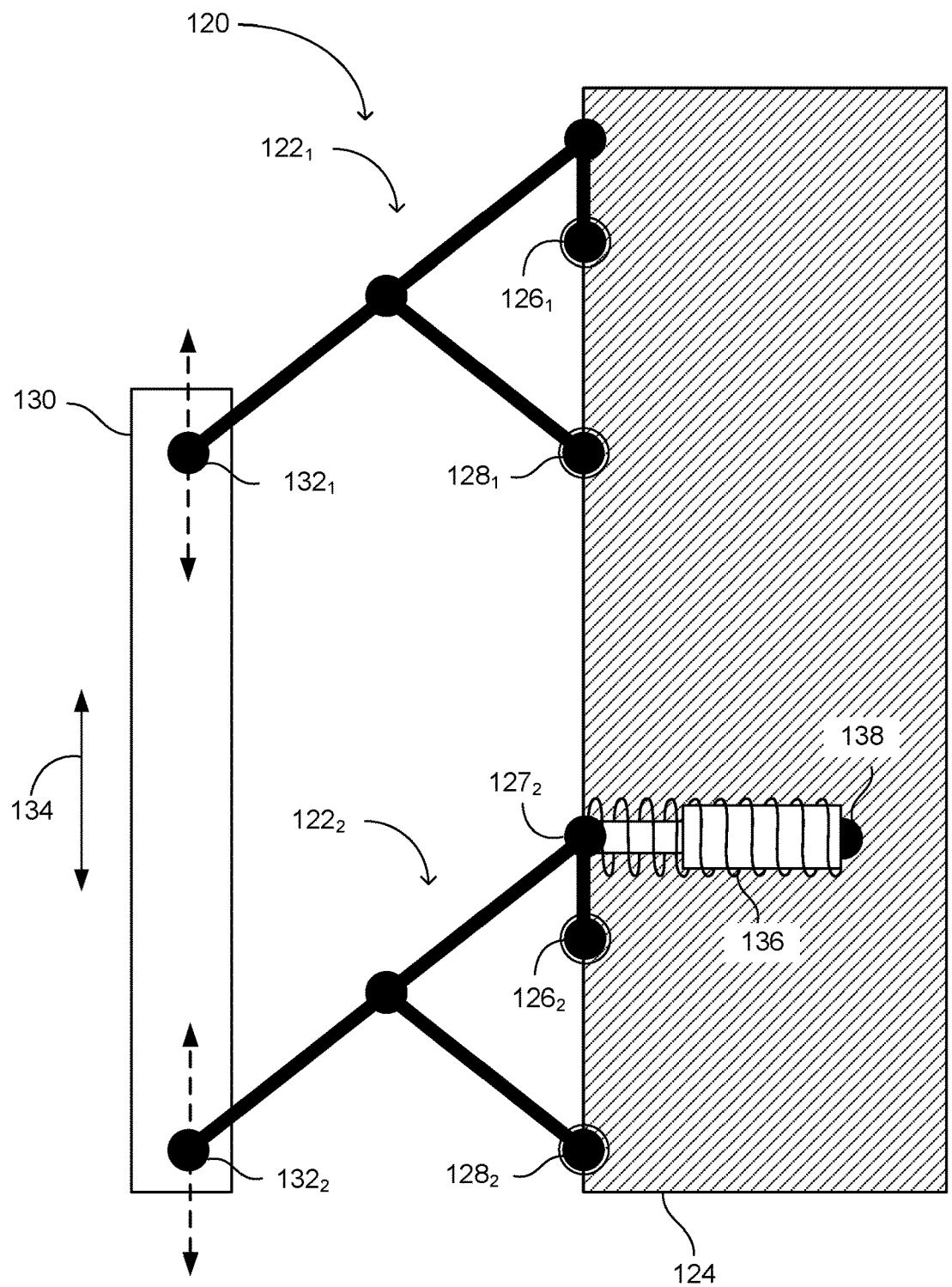

FIG. 2A above referred to an example in which spring-damper 136 is rotatably coupled to second Chebyshev-Lambda mechanism $122_2$ at pivot point $127_2$. It is noted that this is one alternative for positioning a spring-damper in a suspension system according to the disclosed technique described herein above and below. Additional examples are described herein below. In general, a spring-damper may be placed between any two points that the distance therebetween changes during the motion of the wheel, as further exemplified below in conjunction with FIGS. 3A-3E. It is noted that the spring-damper or spring-dampers described herein above and below, included a spring and a damper, both connected to at the same points. In general, a suspension system according to the disclosed technique includes a spring-damper assembly, which includes at least one spring and at least one damper. The spring or springs and the damper or dampers are connected at respective points (i.e., either the same points or different points). Also, the number of springs and the number of dampers need not be the same. Nevertheless, the ends of each spring and damper are coupled between two points that the distance therebetween changes during the motion action of the wheel.

Reference is now made to FIGS. 3A, 3B, 3C, 3D and 3E, which are schematic illustration of a suspension system, generally referenced 150, constructed and operative in accordance with another embodiment of the disclosed technique. The description of suspension system 150 brought herein in conjunction with FIGS. 3A-3E relates to aspects of the disclosed technique which apply to any of the embodiments described herein above and below in conjunction with FIGS. 1A-1D, 2A-2D, 4A-4D, 5A-5B, 6A-6B, 7, 8, 9, 10, 11, 12. Similar to as described in FIGS. 2A-2D, Suspension system 150 includes two Chebyshev-Lambda mechanisms, a first Chebyshev-Lambda mechanism $152_1$ and a second Chebyshev-Lambda mechanism $152_2$, each operating within the respective linear range thereof attached to a reference frame 160. Similar to as described above, reference frame 160 is, for example, a chassis of a vehicle, or a frame of an assembly attachable to a chassis. Suspension system 150 further includes at least one spring-damper 176.

Chebyshev-Lambda mechanism $152_1$ includes a first rotating arm $154_1$, a first suspension arm $156_1$ and a first support arm $158_1$. A rotating arm anchoring end of first rotating arm $154_1$ is rotatably coupled with a reference frame 160 at a first rotating arm anchoring node $162_1$, such that first rotating arm $154_1$ is operative to rotate about first rotating arm anchoring node $162_1$. The location of first rotating arm anchoring node $162_1$ is fixed in reference frame 160 (i.e., indicated by the double circle). A rotating arm motion end of first rotating arm $154_1$ is rotatably coupled with a suspension arm motion end of first suspension arm $156_1$ at a first rotating node $164_1$, such that first rotating arm $154_1$ and first suspension arm $156_1$ are operative to rotate one with respect to other about first rotating node $164_1$. An operational end of first suspension arm $156_1$ is rotatably coupled with suspended mount 170 at a first operational node $172_1$ such that first suspension arm $156_1$ and suspended mount 170 are operable to rotate one with respect to the other about first operational node $172_1$. A support arm anchoring end of first support arm $158_1$ is rotatably coupled with reference frame 160 at a first support anchoring node $166_1$, such that first support arm $158_1$ is operative to rotate about first support anchoring node $166_1$. The location of first support anchoring node $166_1$ is fixed in reference frame 160 (i.e., indicated by the double circle). A support arm motion end of first support arm $158_1$ is rotatably coupled with first suspension arm $156_1$ at a first support node $168_1$, such that first suspension arm $156_1$ and first support arm $158_1$ are operative to rotate one with respect to the other about first support node $168_1$.

Similar to Chebyshev-Lambda mechanism $152_1$, Chebyshev-Lambda mechanism $152_2$ includes a second rotating arm $154_1$, a second suspension arm $156_2$ and a second support arm $158_2$. A rotating arm anchoring end of second rotating arm $154_2$ is rotatably coupled with a reference frame 160 at a second rotating arm anchoring node $162_2$, such that second rotating arm $154_2$ is operative to rotate about second rotating arm anchoring node $162_2$. The location of second rotating arm anchoring node $162_2$ is fixed in reference frame 160 (i.e., indicated by the double circle). A rotating arm motion end of second rotating arm $154_2$ is rotatably coupled with a suspension arm motion end of second suspension arm $156_2$ at second rotating node $164_2$, such that second rotating arm $154_2$ and second suspension arm $156_2$ are operative to rotate one with respect to other about second rotating node $164_2$. An operational end of second suspension arm $156_2$ is rotatably coupled with suspended mount 170 at a second operational node $172_2$ such that first suspension arm $156_2$ and suspended mount 170 are operable to rotate one with respect to the other about second operational node $172_2$. A support arm anchoring end of second support arm $158_2$ is rotatably coupled with reference frame 160 at a second support anchoring node $166_2$, such that second support arm $158_2$ is operative to rotate about second support anchoring node $166_2$. The location of second support anchoring node $166_2$ is fixed in reference frame 160 (i.e., indicated by the double circle). A support arm motion end of second support arm $158_2$ is rotatably coupled with second suspension arm $156_2$ at second support node $168_2$, such that second suspension arm $156_2$ and second support arm $158_2$ are operative to rotate one with respect to the other about second support node $168_2$.

Figure 3A:
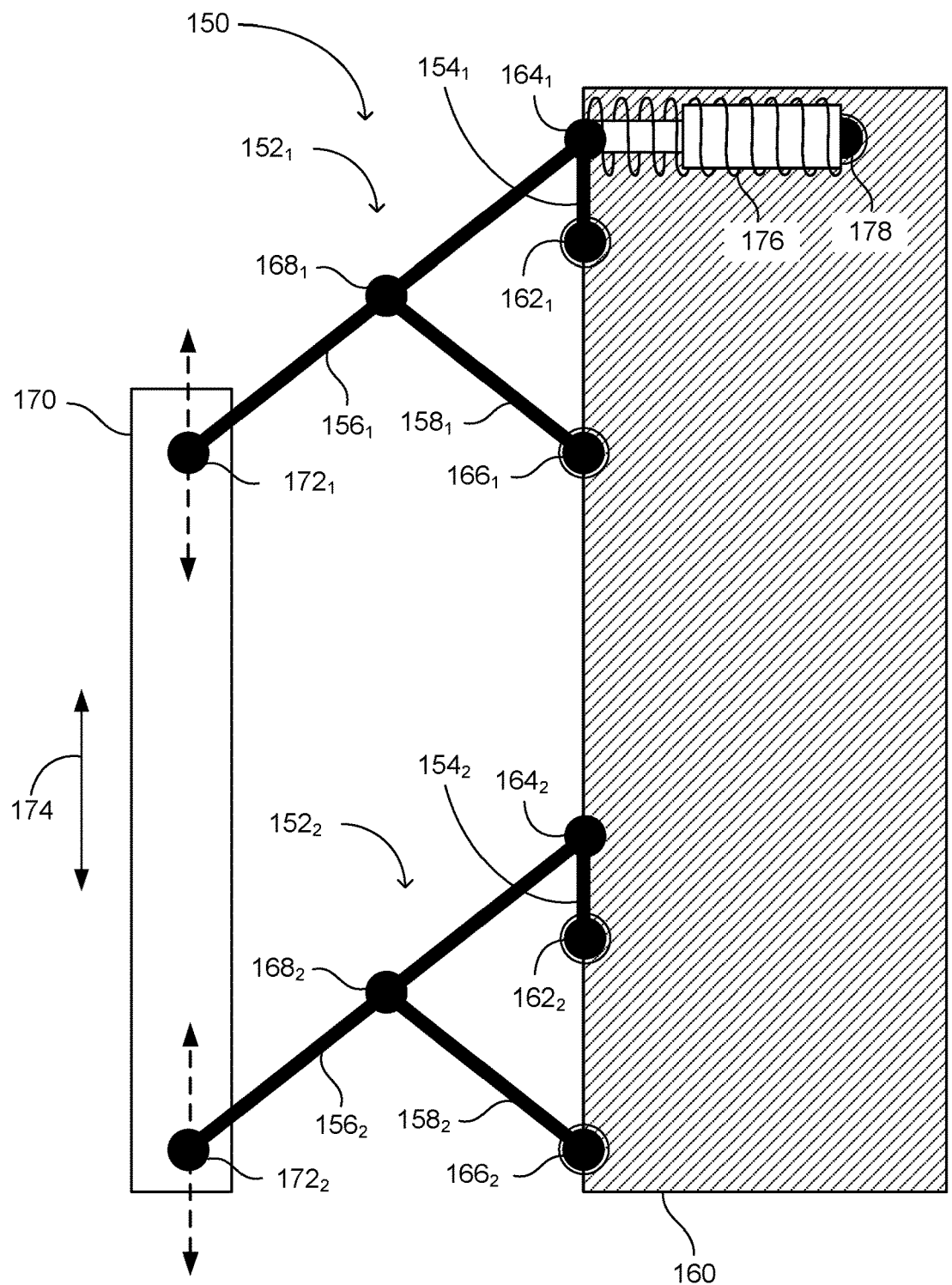
FIGS. 3A, 3B, 3C, 3D and 3E are schematic illustrations of a suspension system, constructed and operative in accordance with another embodiment of the disclosed technique.

FIG. 3A relates to an example in which spring-damper 176 is coupled with first Chebyshev-Lambda mechanism $152_1$. Accordingly, one end of damper 176 is rotatably coupled with first Chebyshev-Lambda mechanism $152_1$ at first rotating node $164_1$ such that spring-damper 176 is free to rotate about first rotating node $164_1$. The other end of spring-damper 176 is coupled with reference frame 160 at pivot point 178, such that spring-damper 176 is free to rotate about pivot point 178. Pivot point 178 is fixed in reference frame 160 (i.e., as indicated by the double circle). Since any vertical motion of suspended mount 170, and thus of the operational end of first Chebyshev-Lambda mechanisms $152_1$ in the vertical direction results in motion of first rotating node $164_1$, such a vertical motion of suspended mount 170 is transferred to spring-damper 176, which reduces the shocks and impacts transferred to reference frame 160 from the wheel.

Figure 3B:
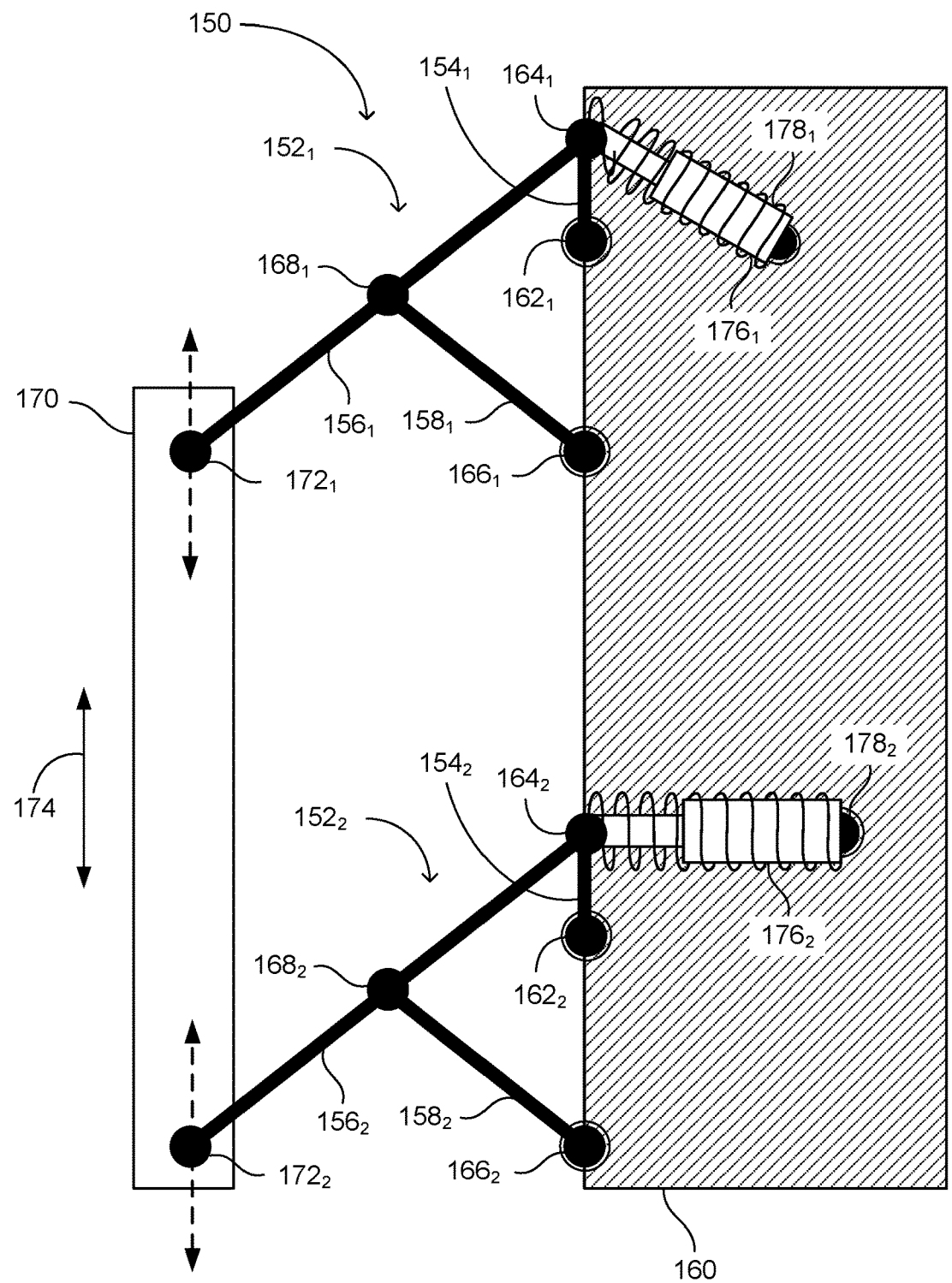

FIG. 3B relates to an example in which two spring-dampers, a first spring-damper $166_1$ and a second spring-damper $166_2$ are coupled with a respective one of first Chebyshev-Lambda mechanism $152_1$ and second Chebyshev-Lambda mechanism $152_2$. Accordingly, one end of spring-damper $176_1$ is coupled with first Chebyshev-Lambda mechanism $152_1$ at first rotating node $164_1$ such that spring-damper $176_1$ is free to rotate about rotating node $164_1$. The other end of spring-damper $176_1$ is coupled with reference frame 160 at pivot point $178_1$, such that spring-damper $176_1$ is free to rotate about pivot point $178_1$. Similarly, one end of spring-damper $176_2$ is coupled with first Chebyshev-Lambda mechanism $152_2$ at second rotating node $164_2$ such that spring-damper $176_2$ is free to rotate about second rotating node $164_2$. The other end of spring-damper $176_2$ is coupled with reference frame 160 at pivot point $178_2$, such that spring-damper $176_2$ is free to rotate about pivot point $178_2$. Since any vertical motion of suspended mount 170, and thus of the operational end of first Chebyshev-Lambda mechanisms $152_1$ and $152_2$ in the vertical direction results in motion of rotating nodes $164_1$ and $164_2$, such a vertical motion of suspended mount 170 is transferred to the respective spring-dampers $176_1$ and $176_2$, which reduces the shocks and impacts transferred to reference frame 160 from the wheel. Employing two spring-dampers may increase control of the shock absorption characteristics of the suspension system. For example, each spring-damper may be associated with different characteristics (e.g., motion characteristics, size, angle relative to the vertical axis, material of the spring, damping medium such as oil or air). These motion characteristics are, for example, the motion frequency range of the spring-damper and/or the motion action distance of the spring-damper. Employing spring-dampers with different motion characteristics may result, for example, in linear spring/damper rate over an extended wheel rate (i.e., relative to a single spring-damper) and/or a uniform frequency response of the suspension system.

Figure 3C:
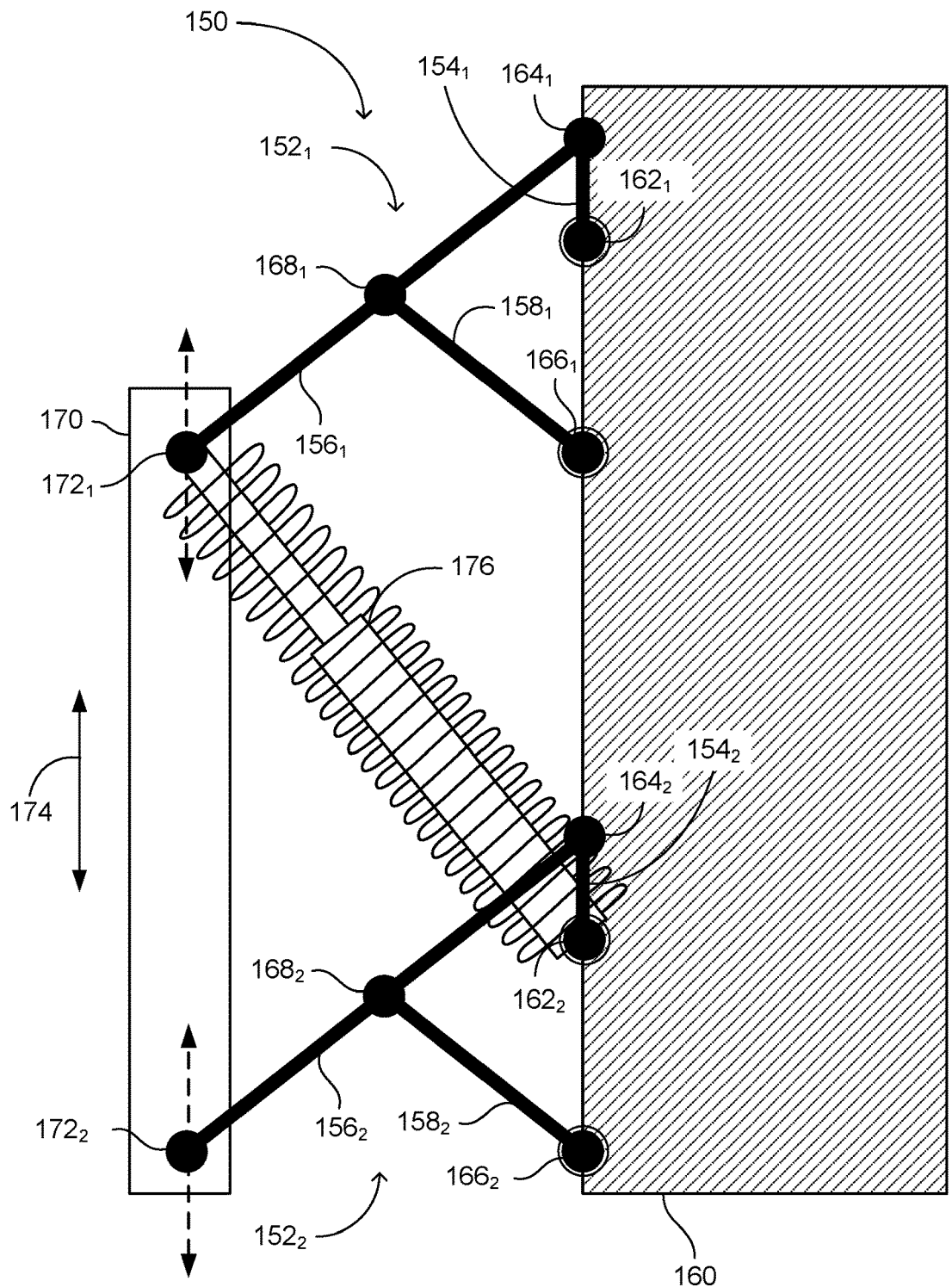

FIG. 3C relates to an example in which spring-damper 176 is coupled between first Chebyshev-Lambda mechanism $152_1$ and second Chebyshev-Lambda mechanism $152_2$. Accordingly, one end of spring-damper 176 is rotatably coupled with first Chebyshev-Lambda mechanism $152_1$ at operational node $172_1$ such that spring-damper 176 is free to rotate about operational node $172_1$. The other end of spring-damper 176 is coupled with reference frame 160 at rotating arm anchoring node $162_2$, such that spring-damper 176 is free to rotate about rotating arm anchoring node $162_2$. Since any vertical motion of suspended mount 170, results in the vertical direction results in motion of operational node $172_1$, such a vertical motion of suspended mount 170 is transferred to spring-damper 176, which reduces the shocks and impacts transferred to reference frame 160 from the wheel. Such orientation may allow a large motion action distance of spring-damper 176 (movement range of suspension arm 168 may be larger than of rotating arm 164), thus increase in shock absorption range compared to the system of FIG. 3B.

Figure 3D:
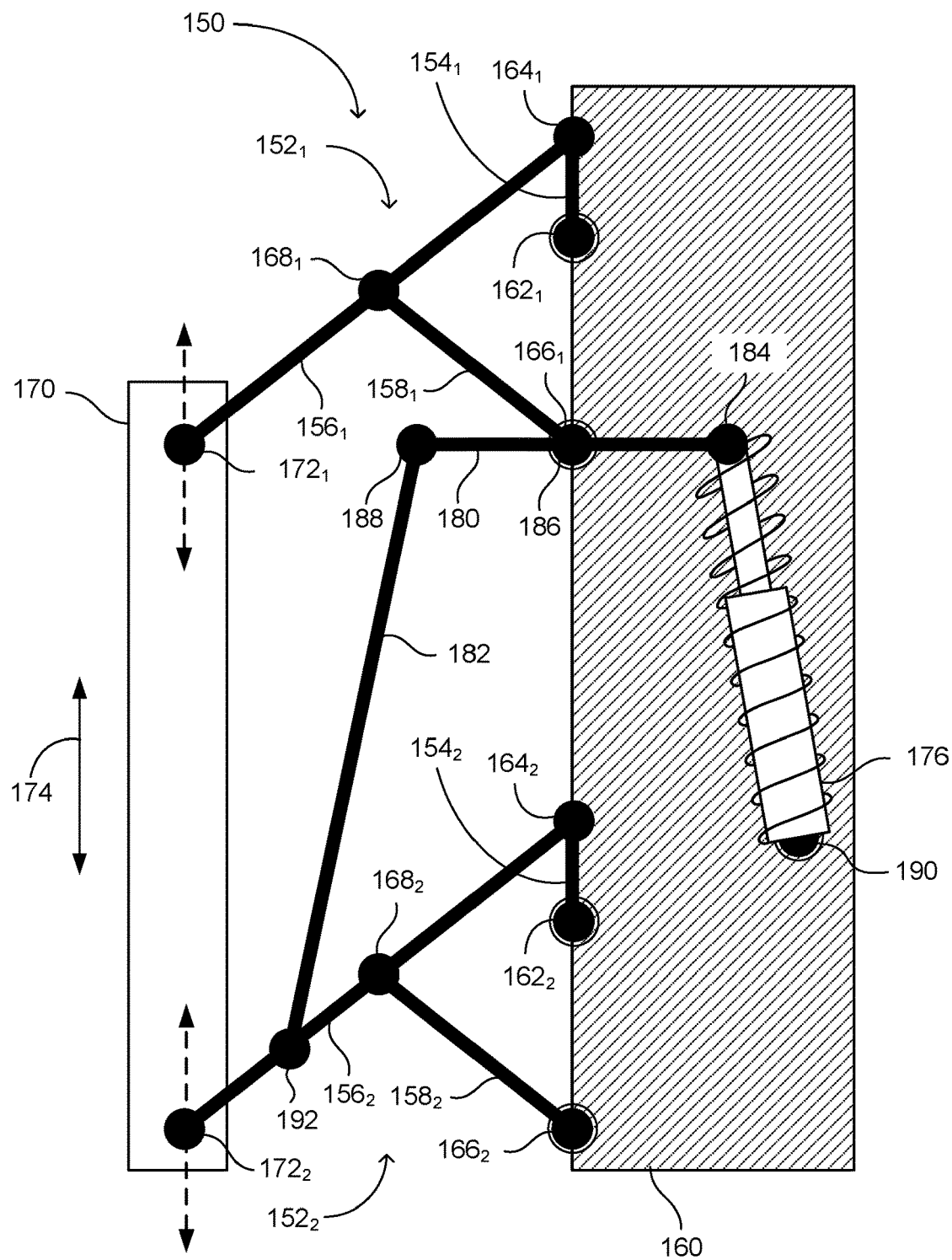

FIG. 3D relates to an example in which suspension mechanism 150 further includes a suspension rocker arm 180 (e.g., a lever) and a suspension pushrod 182, and in which spring-damper 176 is coupled with first Chebyshev-Lambda mechanism $152_2$ via suspension rocker arm 180 and a suspension pushrod 182. Suspension rocker arm 180 includes three pivot points, pivot point 184 and pivot point 188, each at a respective end of suspension rocker arm 180, and a third pivot point 186 located between pivot points 184 and 188. Suspension rocker arm 180 is rotatably coupled with first Chebyshev-Lambda mechanism $152_1$ at the third pivot point 186 and at first support anchoring node $166_1$. Thus, suspension rocker arm 180 is operable to rotate about support anchoring node $166_1$ (i.e., independently of first Chebyshev-Lambda mechanism $152_1$). One end of damper 176 is rotatably coupled with suspension rocker arm 180 at pivot point 184, such that damper 176 and suspension rocker arm 180 are operable to rotate one with respect to the other about pivot point 184. The other end of damper 176 is rotatably coupled with reference frame 160 at pivot point 190, such that damper 176 is operable to rotate about pivot point 190. Pivot point 190 is fixed in reference frame 160 (i.e., as indicated by the double circle). Also, one end of suspension pushrod 182 is rotatably coupled suspension rocker arm 180 at pivot point 188, such that suspension pushrod 182 and suspension rocker arm 180 are operable to rotate one with respect to the other about pivot point 188. The other end of suspension pushrod 182 is rotatably coupled with suspension arm $156_2$ of second Chebyshev-Lambda mechanism $152_2$ at pivot point 192, such that suspension pushrod 182 and suspension arm $156_2$ are operable to rotate one with respect to the other about pivot point 192.

In operation, any motion in the vertical direction of suspended mount 170, and thus of the operational end of first Chebyshev-Lambda mechanisms $152_1$, results in motion of pivot point 192. The motion of pivot point 192 is transferred to spring-damper 176 via, suspension pushrod 182 and suspension rocker arm 180. Thus the shocks and impacts transferred from the wheel to reference frame 160 are reduced. It is noted that in FIG. 3D, suspension rocker arm 180 is exemplified as a lever. However, suspension rocker arm 180 may alternatively be a triangular rocker.

In FIG. 3D, third pivot point 186 and first support anchoring node $166_1$ are depicted to be located at the same location. However, in general, third pivot point 186 may located at other points in reference frame 160. Alternatively, third pivot point 186 may be located at first rotating node 164$_1$, at first support anchoring node 166$_1$ or other locations on first suspension arm 156$_1$ or first support arm 158$_1$.

Figure 3E:
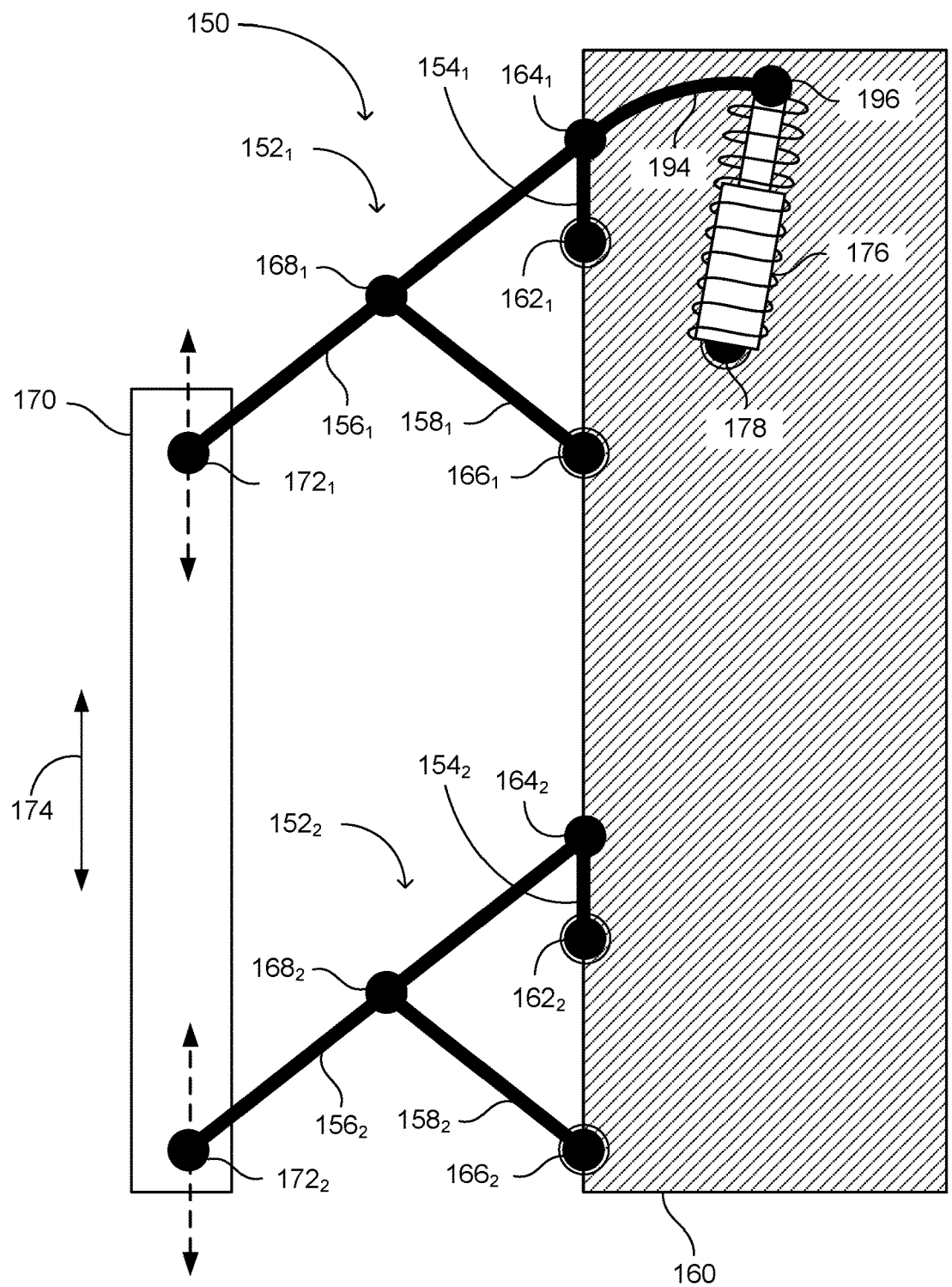

FIG. 3E relates to an example in which spring-damper 176 is coupled with first Chebyshev-Lambda mechanism 152$_1$ at an extension 194 of a first suspension arm 156$_1$. Accordingly, one end of damper 176 is rotatably coupled with first Chebyshev-Lambda mechanism 152$_1$ at first pivot point 196 such that spring-damper 176 is free to rotate about first pivot 196. Rotating node is at an end of extension 194 of first suspension arm 156$_1$. The other end of spring-damper 176 is coupled with reference frame 160 at pivot point 178, such that spring-damper 176 is free to rotate about pivot point 178. Pivot point 178 is fixed in reference frame 160 (i.e., as indicated by the double circle). Since any vertical motion of suspended mount 170, and thus of the operational end of first Chebyshev-Lambda mechanisms 152$_1$ in the vertical direction, results in motion first suspension arm 156$_1$ and thus of pivot point 196 (i.e., via extension 194), such a vertical motion of suspended mount 170 is transferred to spring-damper 176, which reduces the shocks and impacts transferred to reference frame 160 from the wheel. It is noted that in FIG. 3E, extension 194 exhibits a curved shape. However, extension 194 may alternatively be straight. Also, spring-damper 176 is depicted as parallel to the vertical axis. However, spring-damper 176 may be at an angle relative to the vertical axis.

In general, a spring-damper may be placed between two points of the arms that the distance therebetween changes during the motion of the suspension system. The two points are selected or designed such that the spring-damper rate (i.e., force per distance of motion of the spring-damper, damping per travel range of the spring-damper) shall result in a desired wheel rate (i.e., force per distance of motion of the suspension system or the wheel). As described above in conjunction with FIG. 3D, a rocker, such as suspension rocker arm 172, may be employed to achieve a spring-damper rate that shall result in a desired wheel rate.

Reference is now made to FIGS. 4A, 4B, 4C and 4D, which are schematic illustrations of a suspension system, generally referenced 200, constructed and operative in accordance with a further embodiment of the disclosed technique. The description of suspension system 200 brought herein in conjunction with FIGS. 4A-4D relates to aspects of the disclosed technique which apply to any of the embodiments described herein above and below in conjunction with FIGS. 1A-1D, 2A-2D, 3A-3E, 5A-5B, 6A-6B, 7, 8, 9, 10 11 or 12. Specifically, suspension system 200 depicts an implementation example of the suspension system described hereinabove in conjunction with FIG. 3D Suspension. System 200 includes two Chebyshev-Lambda mechanisms, a first Chebyshev-Lambda mechanism 202$_1$ and a second Chebyshev-Lambda mechanism 202$_2$ attached to a reference frame. Similar to as described above, the reference frame is, for example, a chassis of a vehicle, or a frame of an assembly attachable to a chassis.

First Chebyshev-Lambda mechanism 202$_1$ includes a first rotating arm 204$_1$, a first suspension arm 206$_1$ and a first support arm 208$_1$. A rotation arm anchoring end of first rotating arm 204$_1$ is rotatably coupled with a reference frame (not shown) at a first rotating arm anchoring node 210$_1$, such that first rotating arm 204$_1$ is operative to rotate about first rotating arm anchoring node 210$_1$ around a rotation axis (shown as a rotation axis 203$_2$ in FIG. 4D), and the location of first rotating arm anchoring node 210$_1$ is fixed in the reference frame. A rotating arm motion end of first rotating arm 204$_1$ is rotatably coupled with a first suspension arm motion end of first suspension arm 206$_1$ at rotating node 212$_1$, such that first rotating arm 204$_1$ and first suspension arm 206$_1$ are operative to rotate one with respect to other about first rotating node 212$_1$. A support arm anchoring end of first support arm 208$_1$ is rotatably coupled with the reference frame at a first support arm anchoring node 214$_1$, such that support arm 208$_1$ is operative to rotate about first support arm anchoring node 214$_1$ around a rotation axis (shown as a rotation axis 203$_3$ in FIG. 4D), and the location of first support arm anchoring node 214$_1$ is fixed in the reference frame. A support arm motion end of first support arm 208$_1$ is rotatably coupled with first suspension arm 206$_1$ at first support node 216$_1$, such suspension arm 206$_1$ and support arm 208$_1$ are operative to rotate one with respect to the other about first support node 216$_1$.

Second Chebyshev-Lambda mechanism 202$_2$ includes a second rotating arm 204$_2$, a second suspension arm 206$_2$ and a second support arm 208$_2$. A rotating arm anchoring end of second rotating arm 204$_2$ is rotatably coupled with the reference frame at a second rotating arm anchoring node 210$_2$, such that second rotating arm 204$_2$ is operative to rotate about second rotating arm anchoring node 210$_2$ around a rotation axis (shown as a rotation axis 203$_4$ in FIG. 4D), and the location of second rotating arm anchoring node 210$_2$ is fixed in the reference frame. A rotating arm motion end of second rotating arm 204$_2$ is rotatably coupled with a suspension arm motion end of second suspension arm 206$_2$ at second rotating node 212$_2$, such that second rotating arm 204$_2$ and second suspension arm 206$_2$ are operative to rotate one with respect to other about second rotating node 212$_2$. A support arm anchoring end of second support arm 208$_2$ is rotatably coupled with the reference frame at a second support arm anchoring node 214$_2$, such that rotating arm 208$_2$ is operative to rotate about second support arm anchoring node 214$_2$ around a rotation axis (shown as a rotation axis 203$_5$ in FIG. 4D), and the location of pivot point 214$_2$ is fixed in the reference frame. A support arm motion end of second support arm 208$_2$ is rotatably coupled with second suspension arm 206$_2$ at support node 216$_2$, such that second suspension arm 206$_2$ and second support arm 208$_2$ are operative to rotate one with respect to the other about second support node 216$_2$.

Figure 4A:
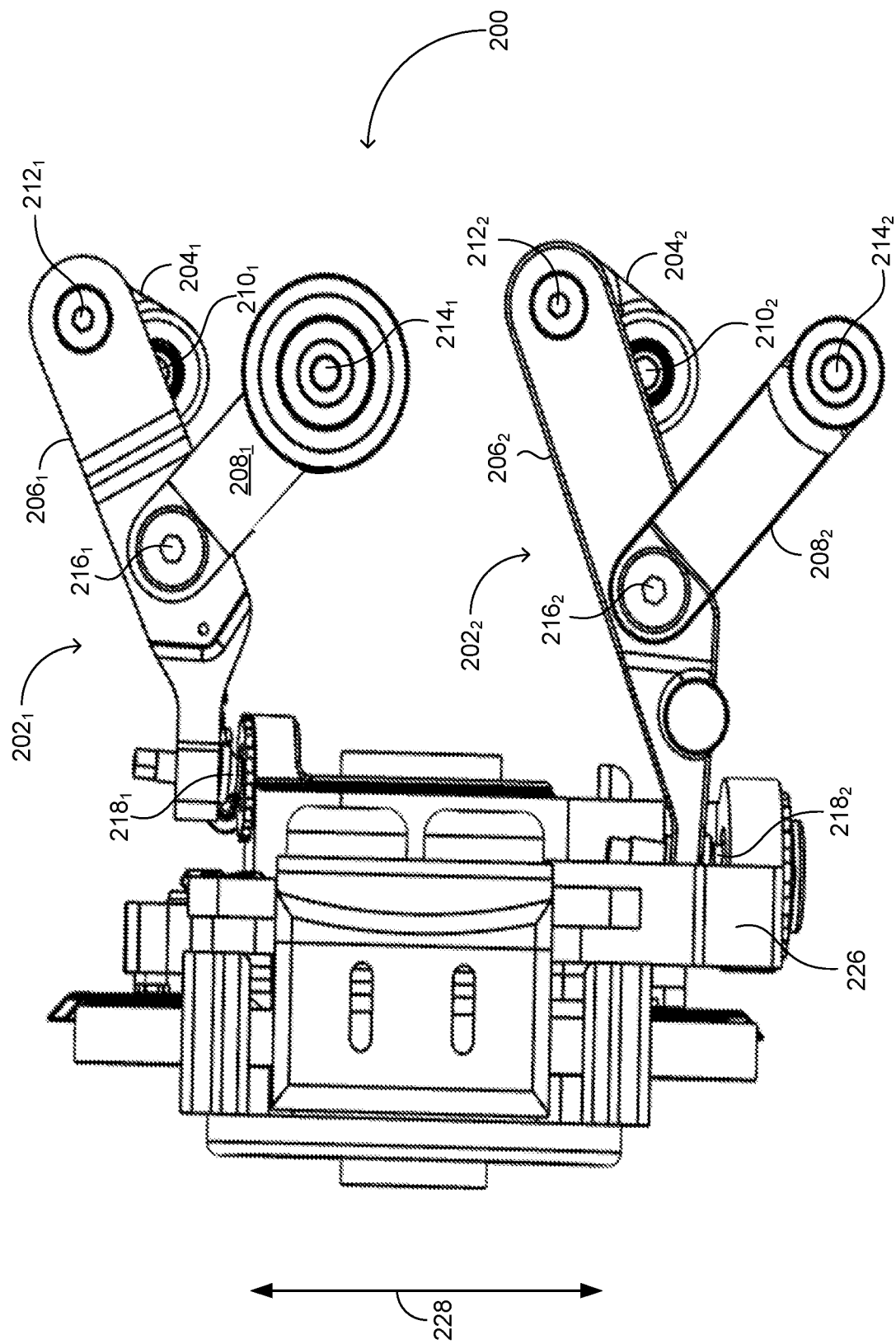
FIGS. 4A, 4B, 4C and 4D, are schematic illustrations of a suspension system, constructed and operative in accordance with a further embodiment of the disclosed technique.
Figure 4B:
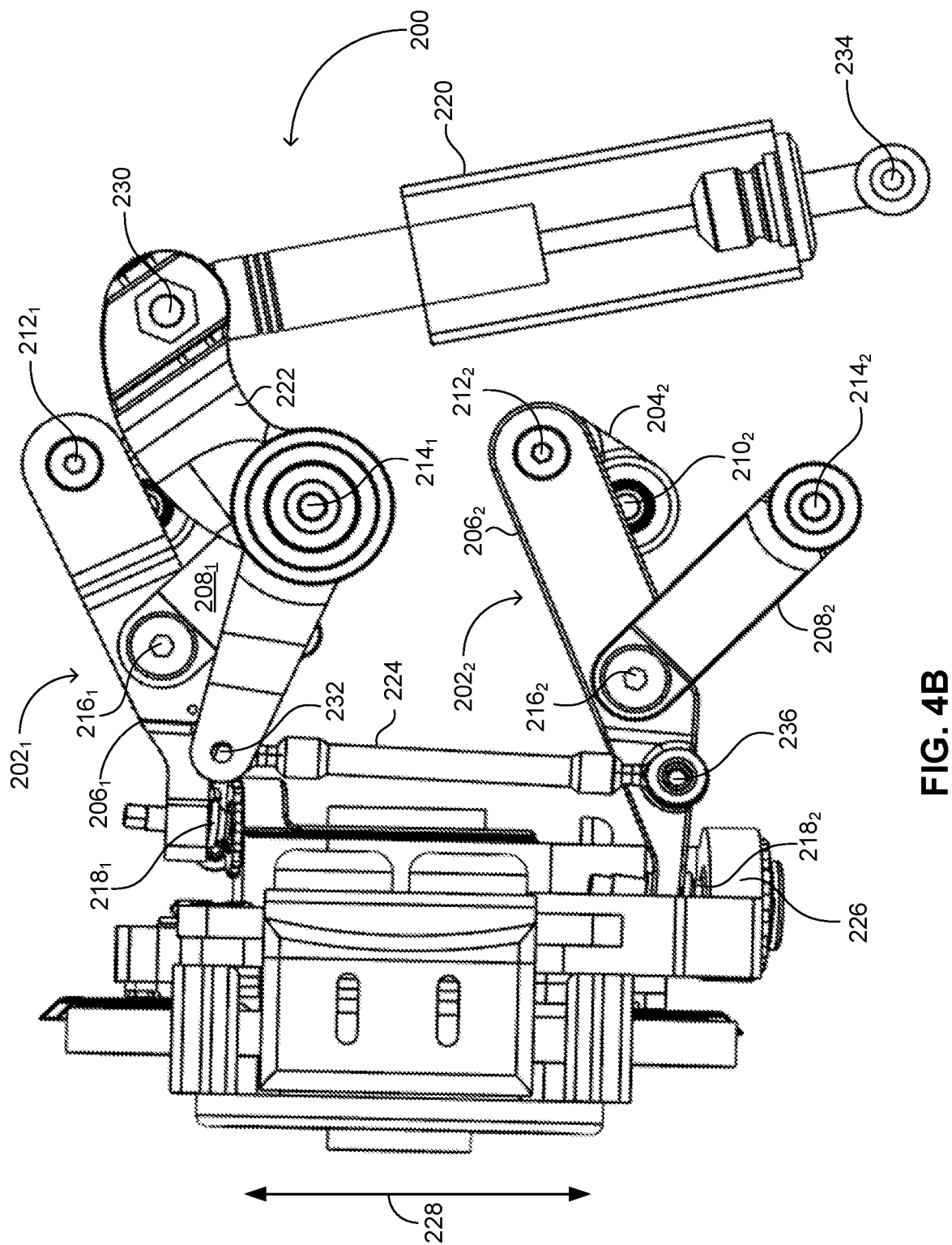
Figure 4C:
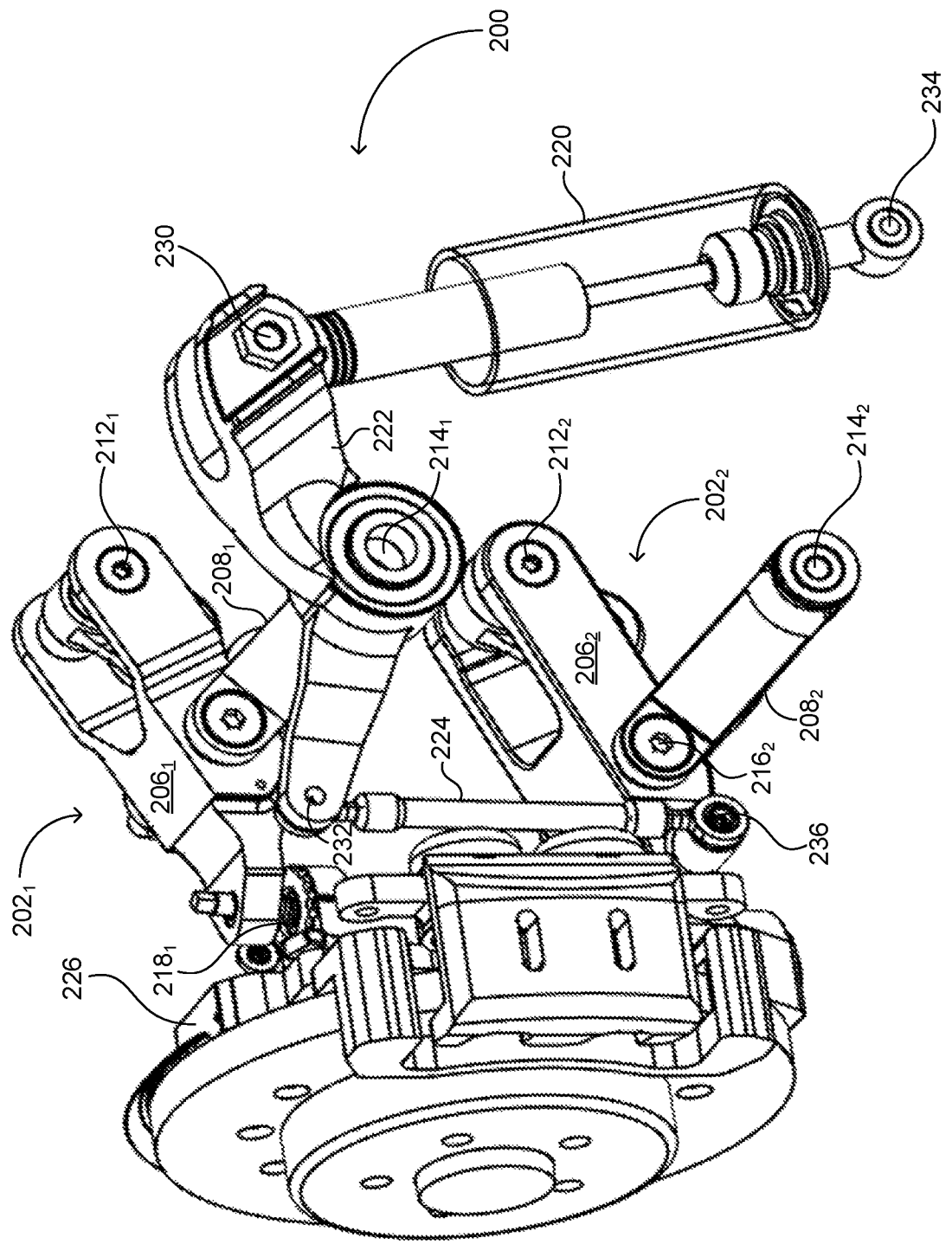
Figure 4D:
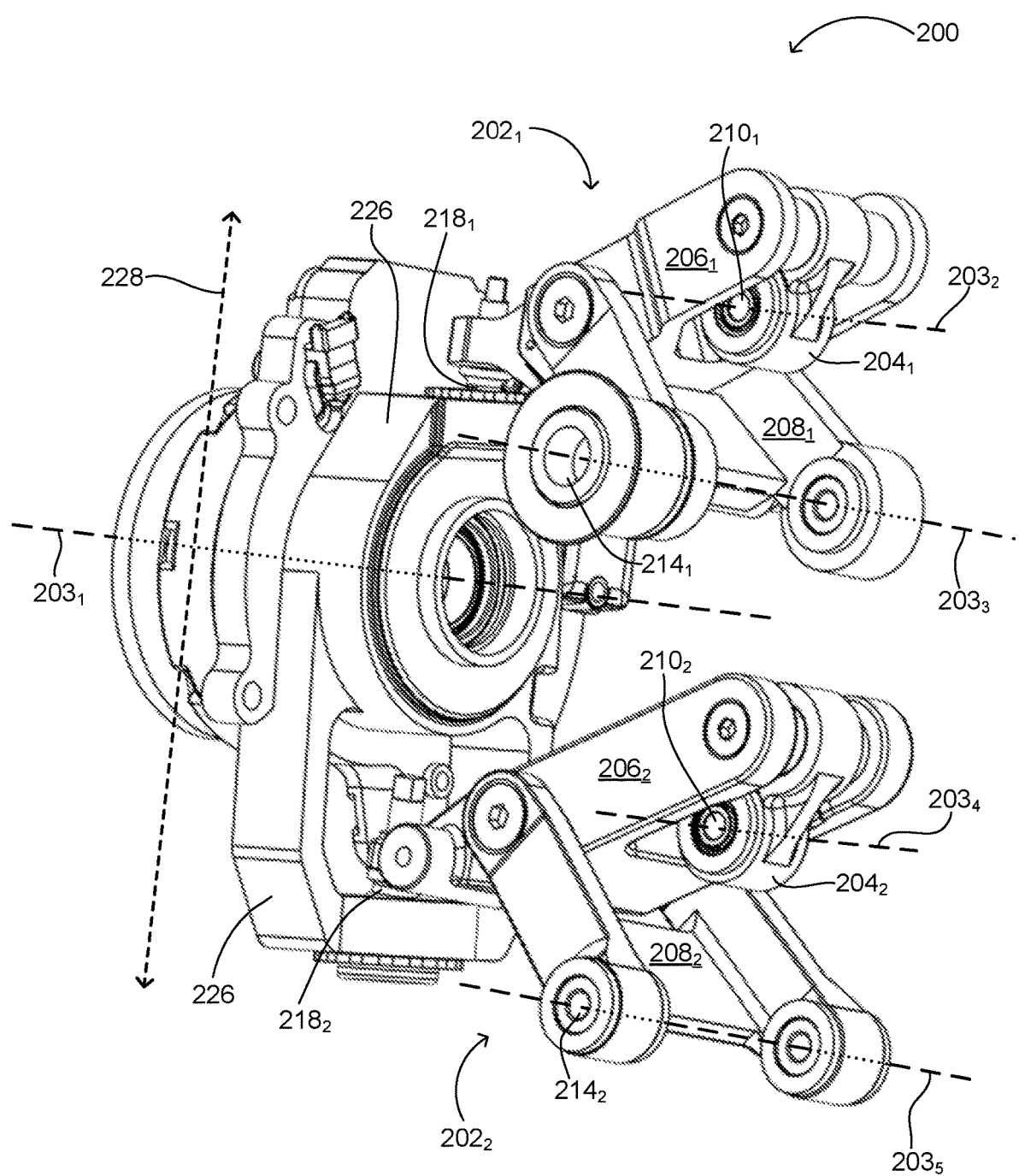

Also, the operational end of first suspension arm 206$_1$ is rotatably coupled, for example, with a suspended mount 226, at first operational node 218$_1$. The operational end of second suspension arm 206$_2$ is rotatable coupled with suspended mount 226 at operational node 218$_2$. Thus, suspended mount 226 is free to move in the vertical axis, and relative to the reference frame, as indicated by arrow 228, similar to as described above in conjunction with FIG. 2A-2D. In FIGS. 4A-4D, operational nodes 218$_1$ and 218$_2$ are implemented, for example, as ball joints. A wheel hub rotation axis is shown in FIG. 4D as a rotation axis 203$_1$.

In general, a suspension system according to the disclosed technique incudes a damper coupled with one of the Chebyshev-Lambda mechanisms. In the example brought forth in FIG. 4B, suspension system 200 further includes a spring-damper (e.g., coil over, fluid filled) 220, coupled with second Chebyshev-Lambda mechanism 202$_2$ via a suspension rocker arm 222 and a suspension pushrod 224. Suspension rocker arm 222 includes three pivot points, pivot point 230 and pivot point 232, each at a respective end of suspension rocker arm 222, and a third pivot point located between pivot points 230 and 232. Suspension rocker arm 222 is rotatably coupled with first Chebyshev-Lambda mechanism $202_1$ at third pivot point thereof and at pivot point $214_1$. Thus, suspension rocker arm 222 is operable to rotate about pivot point $214_1$ (i.e., independently of first Chebyshev-Lambda mechanism $202_1$). One end of damper 220 is rotatably coupled with suspension rocker arm 222 at pivot point 230, such that damper 220 and suspension rocker arm 222 are operable to rotate one with respect to the other about pivot point 230. The other end of spring-damper 220 is rotatably coupled with the reference frame at pivot point 234, such that spring-damper 220 is operable to rotate about pivot point 234.

Also, one end of suspension pushrod 224 is rotatably coupled with suspension rocker arm 222 at pivot point 232, such that suspension pushrod 224 and suspension rocker arm 222 are operable to rotate one with respect to the other about pivot point 232. The other end of suspension pushrod 224 is rotatably coupled with second suspension arm $206_2$ of second Chebyshev-Lambda mechanism $202_2$ at pivot point 236, such that suspension pushrod 224 and suspension arm $206_2$ are operable to rotate one with respect to the other about pivot point 236.

In operation, suspension pushrod 224 and suspension rocker arm 222 transfers the motion of suspended mount 226 in the vertical axis, as indicated direction of arrow 228, to spring-damper 220, thus the shocks and impacts transferred from the wheel to the reference frame are reduced.

In some cases, the wheel may be employed for steering. To that end, a wheel attached to a suspension system such as described above, is also required to rotate about a steering axis, also referred to as 'kingpin axis'. In typical steering systems, steering is achieved by an actuator, which pushes and pulls a steering rod which, in turn, pushes and pulls on the suspended mount such that the suspended mount rotates about a kingpin axis. When the actuator is attached to the vehicle platform, and the wheel moves in the vertical axis (e.g., over an uneven surface), the lateral distance (i.e., the distance along the lateral axis) between the vehicle platform and the connection point of the steering rod with the suspended mount changes, thereby the wheel is steered beyond desired steering angle (a phenomenon known as bump-steering). To prevent this, either the length of the steering rod should change, or the actuator should move, both according to the vertical motion of the wheel.

According to the disclosed technique, a steering actuator is mounted on a rocker which rotates according to the vertical motion of the suspended mount. Consequently, the steering actuator and steering rod also move with respect to the reference frame during the vertical motion of the wheel. Thus, the lateral distance between the reference frame and the connection point between the steering arm with the suspended mount, is maintained (i.e., remains constant or substantially constant) during the vertical motion of the wheel, for any steering angle.

As shown in FIG. 4D, the rotation axes (rotation axes $203_2$-$203_5$) around which first rotation arm $204_1$ (at first rotating arm anchoring node $210_1$), first support arm $208_1$ (at first support arm anchoring node $214_1$), second rotation arm $204_2$ (at second rotating arm anchoring node $210_2$) and second support arm $208_2$ (at second rotating arm anchoring node $214_2$) rotate around are substantially parallel to one another. Thus rotation axis $203_2$ and rotation axis $203_3$ are substantially parallel to one another, rotation axis $203_4$ and rotation axis $203_5$ are substantially parallel to one another, rotation axis $203_2$ and rotation axis $203_4$ are substantially parallel to one another and rotation axis $203_3$ and rotation axis $203_5$ are substantially parallel to one another. In addition, each of rotation axes $203_2$, $203_3$, $203_4$ and $203_5$ are substantially perpendicular to rotation axis $203_1$ which is the wheel hub rotation axis when a wheel (not shown) is in a neutral position and not being steered.

Also shown in FIG. 4D is that both first suspension arm $206_1$ and second suspension arm $206_2$ are transverse to rotation axis $203_1$. Thus the direction of first suspension arm $206_1$, second suspension arm $206_2$ or both is parallel to rotation axis $203_1$ when a wheel (not shown) is in neutral and not being steered. Furthermore, as shown in each of FIGS. 4A-4D, first suspension arm $206_1$ and second suspension arm $206_2$ are positioned one above another and are each coupled with surface-contacts of suspended mount 226 at first operational node $218_1$ and second operational node $218_2$. It is noted as well that suspension system 200 can be used in a bogie-like suspension system (not shown) wherein the rotation axes (rotation axes $203_2$-$203_5$) of a first rotation arm, a first support arm, a second rotation arm and a second support arm are parallel to rotation axis $203_1$ (i.e., the wheel hub rotation axis) when a wheel (not shown) is in a neutral position and not being steered. In such an embodiment, the first suspension arm and the second suspension arm would be perpendicular to rotation axis $203_1$. Thus the direction of first suspension arm $206_1$, second suspension arm $206_2$ or both would be perpendicular to rotation axis $203_1$ when a wheel (not shown) is in a neutral position and not being steered. As mentioned above, in this embodiment, first suspension arm $206_1$ and second suspension arm $206_2$ would be positioned one above another and would each be coupled with surface-contacts of the suspended mount at first and second operational nodes.

Figure 5A:
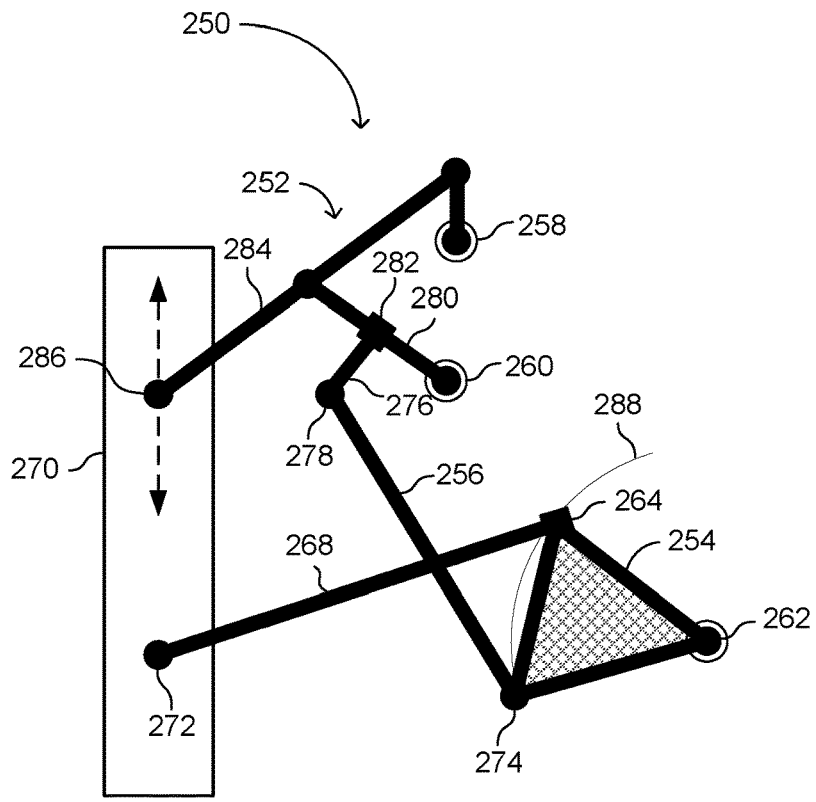
FIGS. 5A and 5B are schematic illustration of a suspension system, constructed and operative in accordance with another embodiment of the disclosed technique.
Figure 5B:
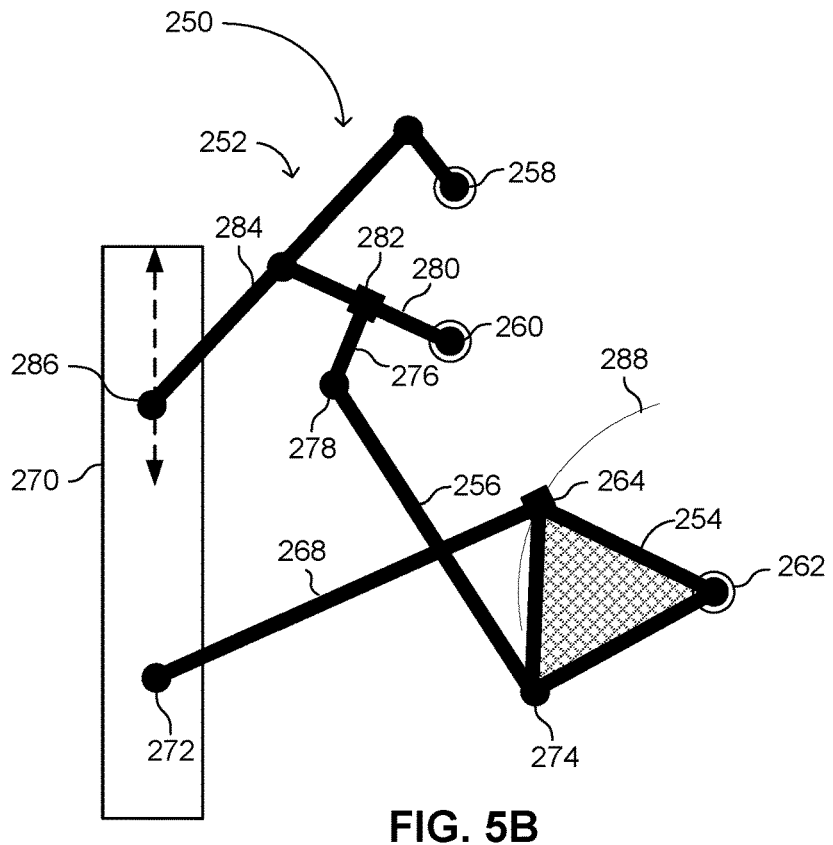

Reference is now made to FIGS. 5A and 5B, which are schematic illustration of a suspension system, generally referenced 250, constructed and operative in accordance with another embodiment of the disclosed technique. Suspension system 250 includes a steering compensation mechanism, which during vertical motion of suspended mount maintains the lateral distance between the reference frame and steering-arm-rotating-node, located on the suspended mount. The description of suspension system 250 brought herein in conjunction with FIGS. 5A-5B relates to aspects of the disclosed technique which apply to any of the embodiments described herein above and below in conjunction with FIGS. 2A-2D, 3A-3E, 4A-4D, 6A-6B, 7 8, 9, 10 11 or 12. System 250 employs the principles described herein above in conjunction with FIGS. 2A-2D, 3A-3E and 4A-4D. System 250 includes a Chebyshev-Lambda mechanism 252 and a steering actuator rocker 254, which are coupled therebetween via a steering pushrod 256. It is noted that for the sake of clarity of the drawings and explanations, only a single Chebyshev-Lambda mechanism is depicted in FIGS. 5A and 5B. However, as further elaborated below, the steering mechanism described in conjunction with FIGS. 5A and 5B can be employed with a double Chebyshev-Lambda suspension system described herein above, and below.

Chebyshev-Lambda mechanism 252 is coupled with a reference frame (not shown) at rotating arm anchoring node 258 and support arm anchoring node 260, similar to as described above in conjunction with FIGS. 2A-2D, 3A-3E. Steering actuator rocker 254 is rotatably coupled with a reference frame at steering rocker anchoring node 262 such that steering actuator rocker 254 is operable to rotate about steering rocker anchoring node 262. Also, an actuator (not shown in FIGS. 5A and 5B for clarity) is coupled with steering actuator rocker 254 at actuator mounting point 264. Mounting point 264 may include a joint (e.g. ball joint), allowing motion between the actuator and actuator rocker 254, as the rocker rotates about pivot 262. A steering arm 268 extends from the actuator to suspended mount 270. Steering arm 268 is rotatably coupled with suspended mount 270 at steering arm rotating node 272 such that steering arm and suspended mount are operable to rotate one with respect to the other about steering arm rotating node 272.

One end of steering pushrod 256 is rotatably coupled with steering actuator rocker 254 at pushrod rotating node 274 such that steering pushrod 256 and steering actuator rocker 254 are operable rotate one with respect to the other about pushrod rotating node 274. The other end of steering pushrod 256 is rotatably coupled with Chebyshev-Lambda mechanism 252 via one end of a stub 276 at pivot point 278 such that steering pushrod 256 and stub 276 are operable to rotate one with respect to the other about pivot point 278. The other end of stub 276 is rigidly coupled with support arm 280 of Chebyshev-Lambda mechanism 252, at point 282. For completeness, an operational end of suspension arm 284 of Chebyshev-Lambda mechanism 252 is rotatably coupled with suspended mount 270 at operational node 286 such that suspension arm 284 and suspended mount 270 are operable to rotate one with respect to the other about operational node 286.

In operation, vertical motion of suspended mount 270 is transferred via Chebyshev-Lambda mechanism 252, stub 276, steering pushrod 256 to steering actuator rocker 254 causing steering actuator rocker to rotate about pivot point 262. Consequently, point 264 and thus the steering actuator, moves on an arc 288, thus maintaining the lateral distance between point 262 and pivot point 272, regardless of the motion of suspended mount 270. In other words, the length of the steering rod 268 remains constant or substantially constant during the vertical motion of the wheel, for any steering angle. For example, in FIG. 5B, suspended mount 270 has moved down relative to the position thereof in FIG. 5A. However, the steering angle and the length of steering arm 268 did not change (i.e., beyond a determined margin of error).

In FIGS. 5A and 5B, stub 276 is optional. In general, the other end of steering pushrod 256 may be rotatably coupled with any point which exhibits a vertical motion with the vertical motion of suspended mount 270. Pushrod 256 shall transfer this vertical motion to rocker 254.

Figure 6A:
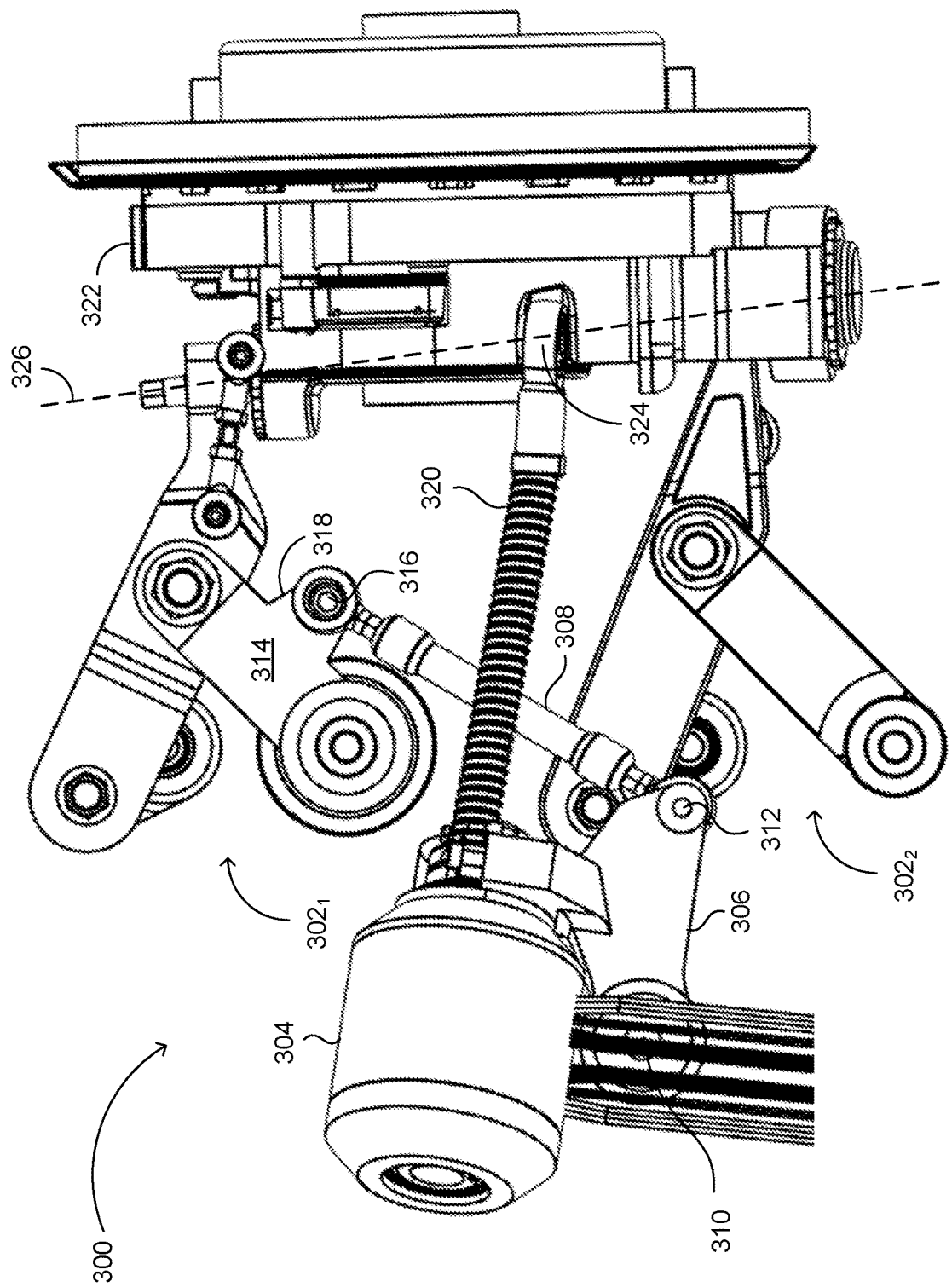
FIGS. 6A and 6B are schematic illustrations of a suspension system, constructed and operative in accordance with a further embodiment of the disclosed technique.
Figure 6B:
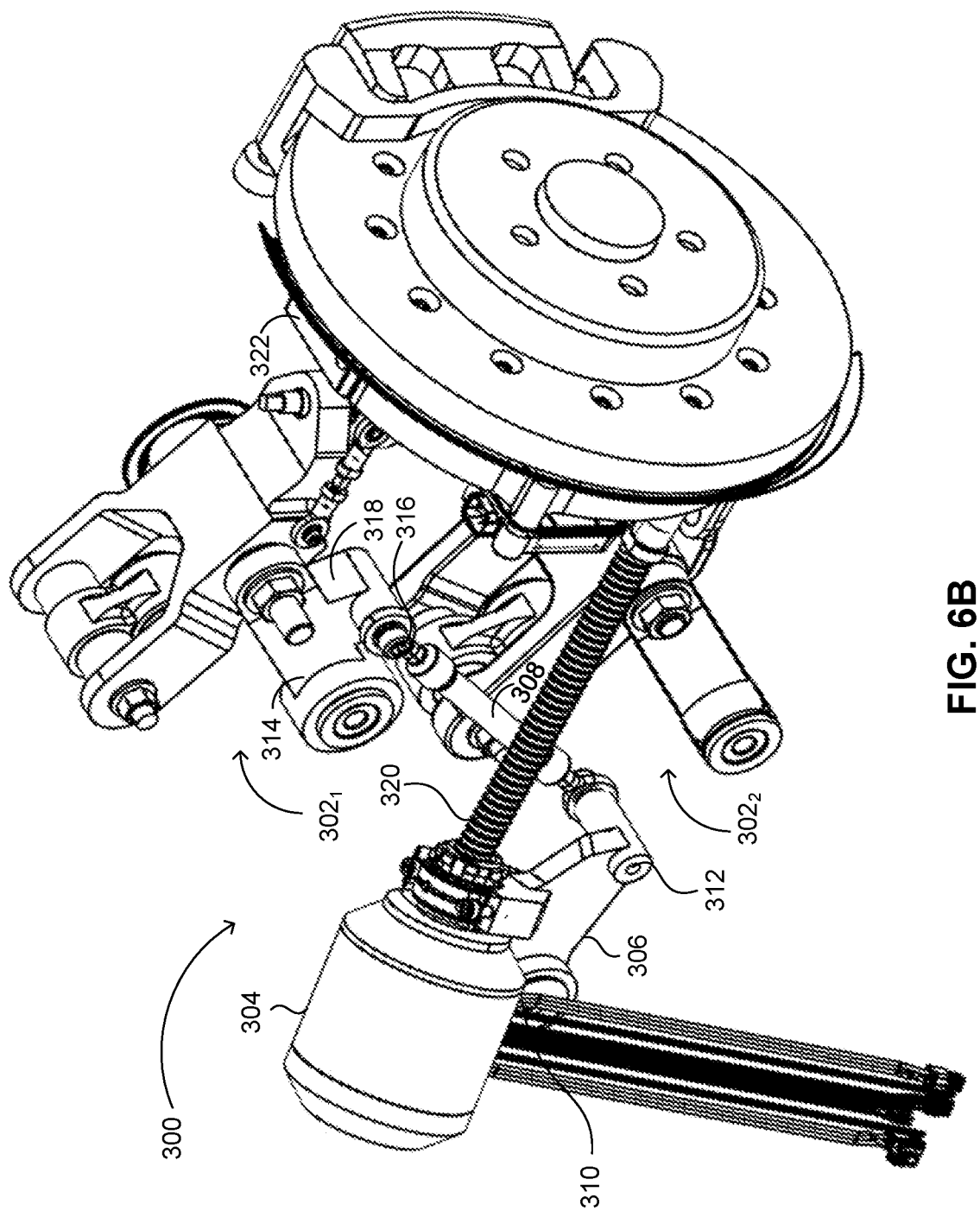

Reference is now made to FIGS. 6A and 6B, which are schematic illustrations of a suspension, generally referenced 300, constructed and operative in accordance with a further embodiment of the disclosed technique. Suspension system 300 includes a steering compensation mechanism, which during vertical motion of the suspended mount, maintains the lateral distance between the reference frame and steering arm rotating node 324, located on the suspended mount. The description of suspension system 300 brought herein in conjunction with FIGS. 6A-6B relates to aspects of the disclosed technique which apply to any of the embodiments described herein above and below in conjunction with FIGS. 1A-1D, 2A-2D, 3A-3E, 4A-4D, 5A-5B, 7, 8, 9, 10, 11 or 12. System 300 is an implementation example of mechanism described herein above in conjunction with FIGS. 5A and 5B, employed in a suspension system described hereinabove in conjunction with FIGS. 2A-2D, 3A-3E and 4A-4D. System 300 includes two Chebyshev-Lambda mechanisms, a first Chebyshev-Lambda mechanism $302_1$ and a second Chebyshev-Lambda mechanism $302_2$ attached to a reference frame. Similar to as described above, the reference frame is, for example, a chassis of a vehicle, or a frame of an assembly attachable to a chassis. System 300 further includes a steering actuator 304, a rocker 306 and a pushrod 308.

Steering actuator 304 is coupled with rocker 306. Rocker 306 is coupled with a reference frame (not shown) at pivot point 310 such that rocker 306 is operable to rotate relative to the reference frame about pivot point 310. One end of pushrod 308 is coupled with rocker 306 at pivot point 312, such that pushrod 308 and rocker 306 are operable to rotate one with respect to the other about pivot point 312. The other end of pushrod 308 is coupled with support arm 314 of first Chebyshev-Lambda mechanism $302_1$, at pivot point 316, via stub 318, such that pushrod 308 and support arm 314 are operable to rotate one with respect to the other. Steering arm 320 is coupled to suspended mount 322 at steering arm rotating node 324, located on said suspended mount 322, such that steering arm 320 and suspended mount 322 are operable to rotate one with respect to the other.

Steering actuator 304 is operative to extend and retract steering arm 320. Consequently, suspended mount 322 rotates about king pin axis 326 enabling steering of a wheel at least within a steering angle range (e.g., on the order of tens of degrees to each direction). In the example brought forth in FIGS. 6A and 6B, vertical motion of suspended mount 322 is transferred via first Chebyshev-Lambda mechanism $302_1$, stub 314, steering pushrod 308 to rocker 306 causing rocker to rotate about pivot point 310. Consequently, steering actuator 304 moves on an arc, thus maintaining the lateral distance between pivot point 310 and steering arm rotating node 324 during the vertical motion of the wheel for any steering angle. Alternatively, stub 314 may be coupled with Chebyshev-Lambda mechanism $302_2$.

It is noted that the geometry the suspension system and steering compensation described above may be defined to allow a controlled change in the lateral distance between the wheel mount and the reference frame, within a range which provides desired dynamic behavior for the vehicle (e.g. keeping wheel in a toe-in position). For example, the geometry of rocker 306, as well as the sizes and ratios between the different linkages (e.g. ratios between linkages of arm $302_1$ and/or $302_2$) may be defined to provide desired dynamic behavior. In cars, such a change in distance may be defined to allow a limited amount of bump steer, for example between 0.8 to 1.0 degrees over the vertical motion of the suspended mount.

Reference is now made to FIGS. 7A, 7B, 7C and 7D, which are schematic illustrations of a suspension system, generally referenced 350, constructed and operative in accordance with another embodiment of the disclosed technique. The description of suspension system 350 brought herein in conjunction with FIGS. 7A-7D relates to aspects of the disclosed technique which apply to any of the embodiments described herein above and below in conjunction with FIGS. 1A-1D, 2A-2D, 3A-3E, 4A-4D, 5A-5B, 6A-6B, 8, 9, 10 11, or 12. Suspension system 350 includes two Chebyshev-Lambda mechanisms, first Chebyshev-Lambda mechanism $352_1$ and second Chebyshev-Lambda mechanism $352_2$ attached to a reference frame 360. Similar to as described above, reference frame 360 is, for example, a chassis of a vehicle, or a frame of an assembly attachable to a chassis. Each one of first Chebyshev-Lambda mechanism $352_1$ and second Chebyshev-Lambda mechanism $352_2$ includes a respective rotating arm, a respective suspension arm and a respective support arm.

First Chebyshev-Lambda mechanism $350_1$ includes a first rotating arm $354_1$ a first suspension arm $356_1$ and a first support arm $358_1$. A rotating arm anchoring end of first rotating arm $354_1$ is rotatably coupled with a reference frame 360 at a first rotating arm anchoring node $362_1$, such that rotating arm $354_1$ is operative to rotate about first rotating arm anchoring mode $362_1$ and the location of first rotating arm anchoring mode $362_1$ is fixed in a reference frame 360. A rotating arm motion end of first rotating arm $354_1$ is rotatably coupled with a suspension arm motion end of first suspension arm $356_1$ at a first rotating node $364_1$, such that first rotating arm $354_1$ and first suspension arm $356_1$ are operative to rotate one with respect to other about first rotating node point $364_1$. A support arm anchoring end of first support arm $358_1$ is rotatably coupled with reference frame 360 at a support anchoring node $366_1$, such that first support arm $358_1$ is operative to rotate about support anchoring node $366_1$ and the location of support anchoring node $366_1$ is fixed in reference frame 360. A support arm motion end of first support arm $358_1$ is rotatably coupled with first suspension arm $356_1$ at a first support node $368_1$, such first suspension arm $356_1$ and first support arm $358_1$ are operative to rotate one with respect to the other about first support node $368_1$.

Second Chebyshev-Lambda mechanism $350_2$ includes a second rotating arm $354_2$ a second suspension arm $356_2$ and a second support arm $358_2$. A rotating arm anchoring end of second rotating arm $354_2$ is rotatably coupled with a reference a frame 360 at a second anchoring node $362_2$, such that second rotating arm $354_2$ is operative to rotate about second anchoring node $362_2$ and the location of second anchoring node $362_2$ is fixed in a reference frame 360. A rotating arm motion end of second rotating arm $354_2$ is rotatably coupled with a suspension arm motion end of second suspension arm $356_2$ at second rotating node $364_2$, such that second rotating arm $354_2$ and second suspension arm $356_2$ are operative to rotate one with respect to other about second rotating node $364_2$. A support arm anchoring end of second support arm $358_2$ is rotatably coupled with reference frame 360 at a second support are anchoring node $366_2$, such that support arm $358_2$ is operative to rotate about second support are anchoring node $366_2$ and the location of second support are anchoring node $366_2$ is fixed in reference frame 360. A support arm motion end of second support arm $358_1$ is rotatably coupled with second suspension arm $356_2$ at a second support node $368_2$, such second suspension arm $356_2$ and second support arm $358_2$ are operative to rotate one with respect to the other about second support node $368_2$.

Also, the operational end of first suspension arm $356_1$ is rotatably coupled, for example, with a suspended mount 370 at operational node $372_1$, such that the suspension arm $356_1$ and suspended mount 370 are free to rotate one with respect to the other. The operational end of second suspension arm $356_2$ is rotatably coupled, for example, with a suspended mount 370, at second operational node $372_2$, such that the second suspension arm $356_2$ and suspended mount 370 are free to rotate one with respect to the other. Thus, suspended mount 370 is free to move in the vertical axis, and relative to the reference frame, as indicated by arrow 374, similar to as described above in conjunction with FIG. 2A-2D.

Figure 7A:
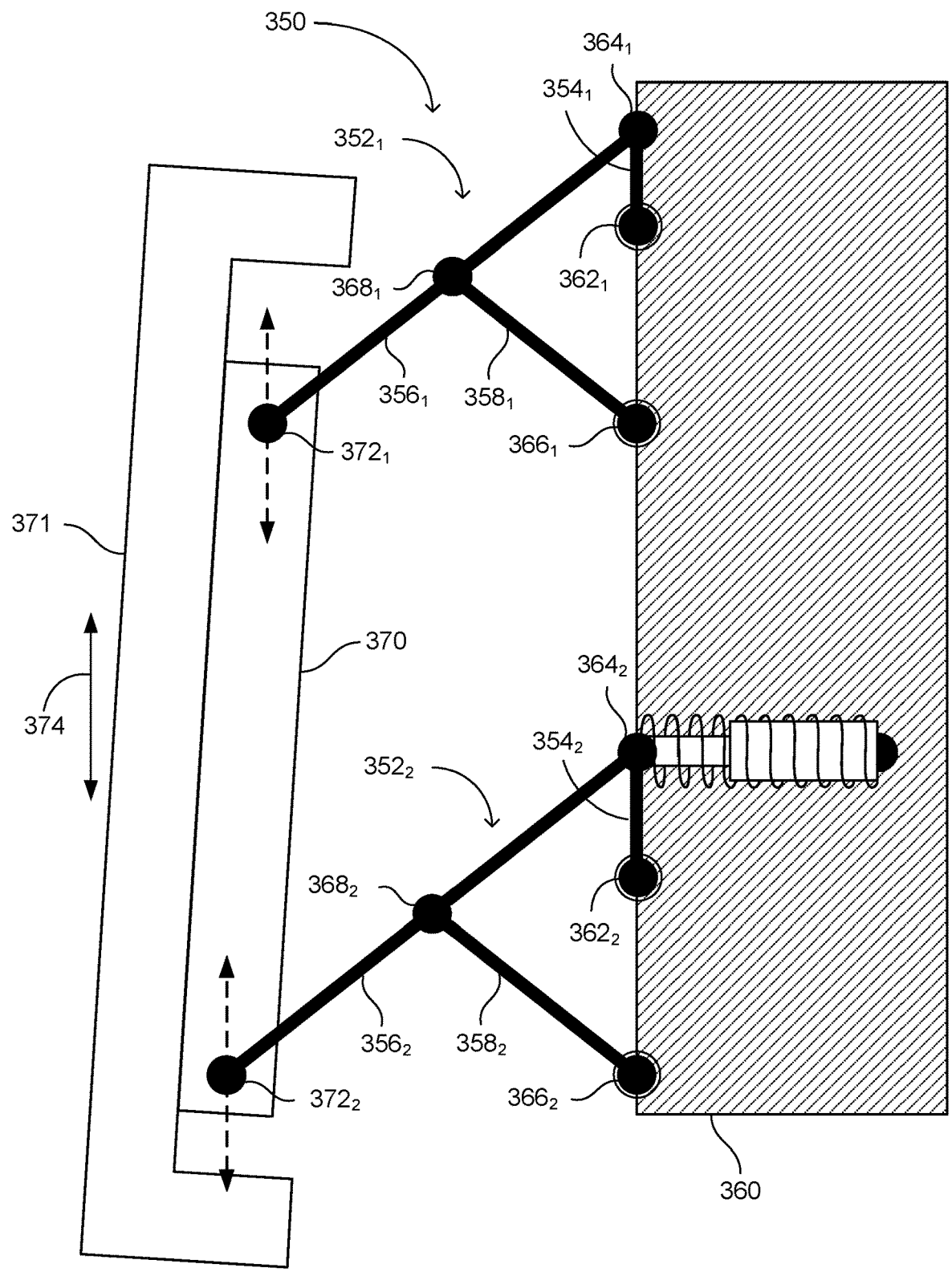
FIGS. 7A, 7B, 7C and 7D are schematic illustrations of a suspension system, constructed and operative in accordance with another embodiment of the disclosed technique.

In the example brought forth in FIG. 7A, the dimensions of first Chebyshev-Lambda mechanism $352_1$ are different from the dimensions of second Chebyshev-Lambda mechanism $352_2$. For example, if the length of first rotating arm $354_1$ is CA', the length of second rotating arm is AC (i.e., A times C), where 'C' is a constant. Thus, the length of second support arm $356_2$ is 2.5 AC and the length of second suspension arm $358_2$ is 5 AC. This difference in the dimensions of first Chebyshev-Lambda mechanism $352_1$ and second Chebyshev-Lambda mechanism $352_2$, results in a camber angle (i.e., the wheel is at non-vertical angle relative to the horizontal plane). The camber angle can be selected by a corresponding selection of 'C'. FIG. 7A depicts negative camber. However, a positive camber may alternatively be created. It is noted that although the different dimensions of first Chebyshev-Lambda mechanism $352_1$ and second Chebyshev-Lambda mechanism $352_2$, the operational ends thereof still move vertically in the direction of arrow 374. It is also noted that, alternatively or additionally, first Chebyshev-Lambda mechanism $352_1$ and second Chebyshev-Lambda mechanism $352_2$ are not aligned vertically, such that a line defined by the operational ends of first Chebyshev-Lambda mechanism $352_1$ and second Chebyshev-Lambda mechanism $352_2$ is tilted in the in-motion direction relative to the vertical axis.

Figure 7B:
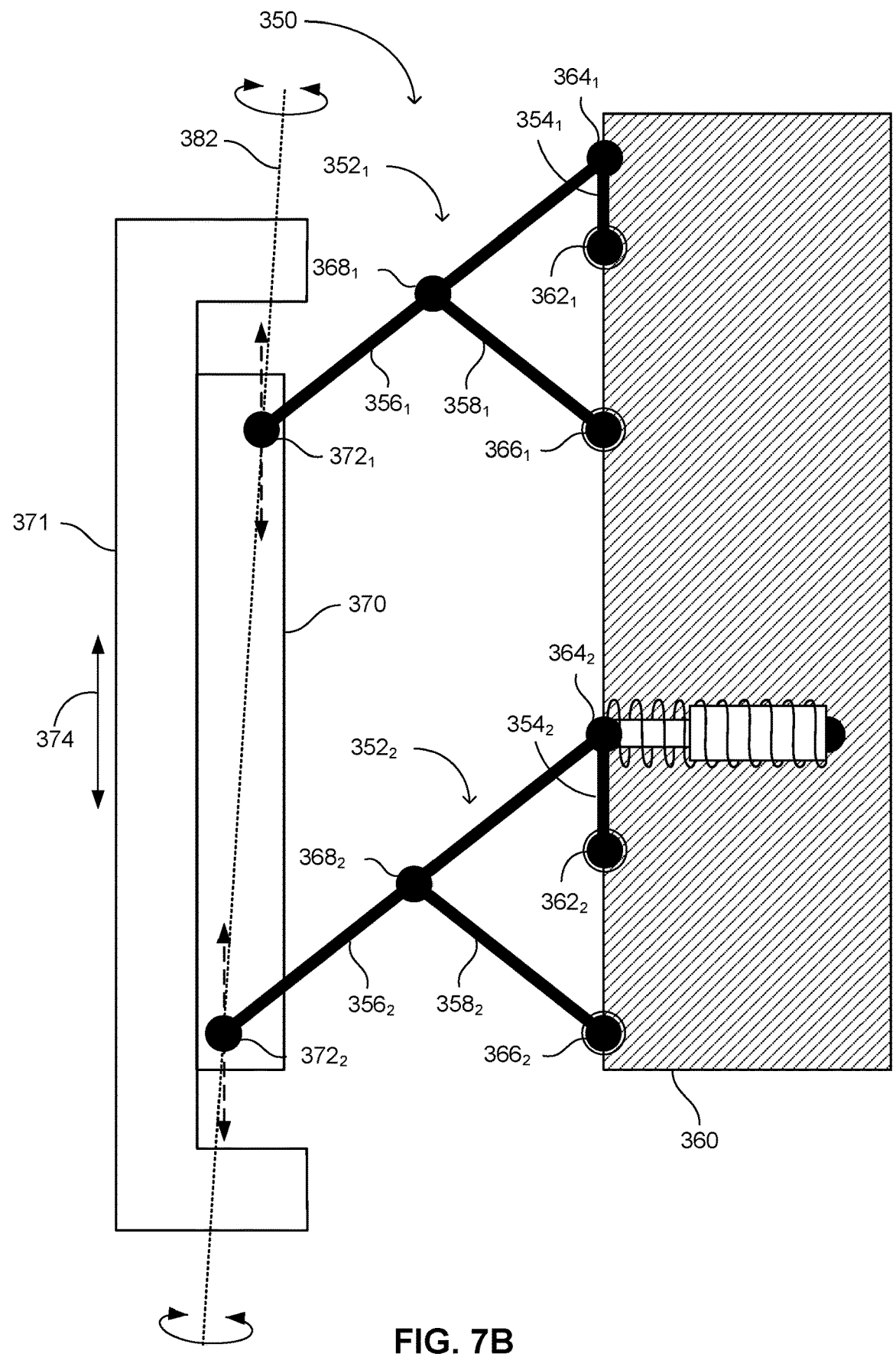

Alternatively or additionally to creating camber, and with reference to FIG. 7B, when the wheel is steered, the different dimensions of first Chebyshev-Lambda mechanism $352_1$ and second Chebyshev-Lambda mechanism $352_2$ may be employed to create a non-vertical kingpin axis 382. In FIG. 7B, suspended mount 370 rotates about kingpin axis 382. Negative or positive camber and/or a non-vertical kingpin axis affect the dynamic performance of the vehicle (e.g., traction, cornering, body roll, steering force and the like). It is noted that roll axis of wheel 371 and kingpin axis 382 need not be perpendicular.

Figure 7C:
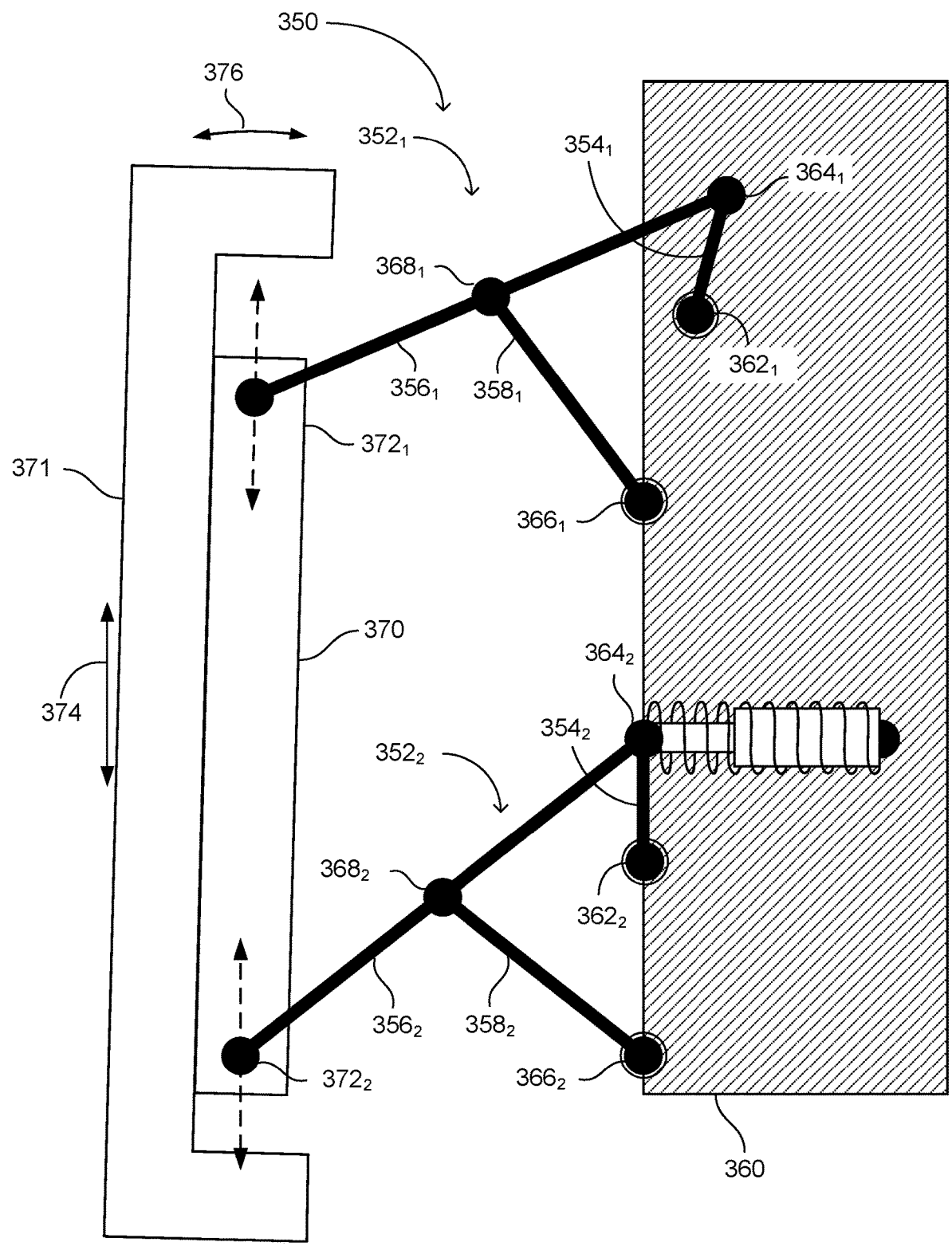
Figure 7D:
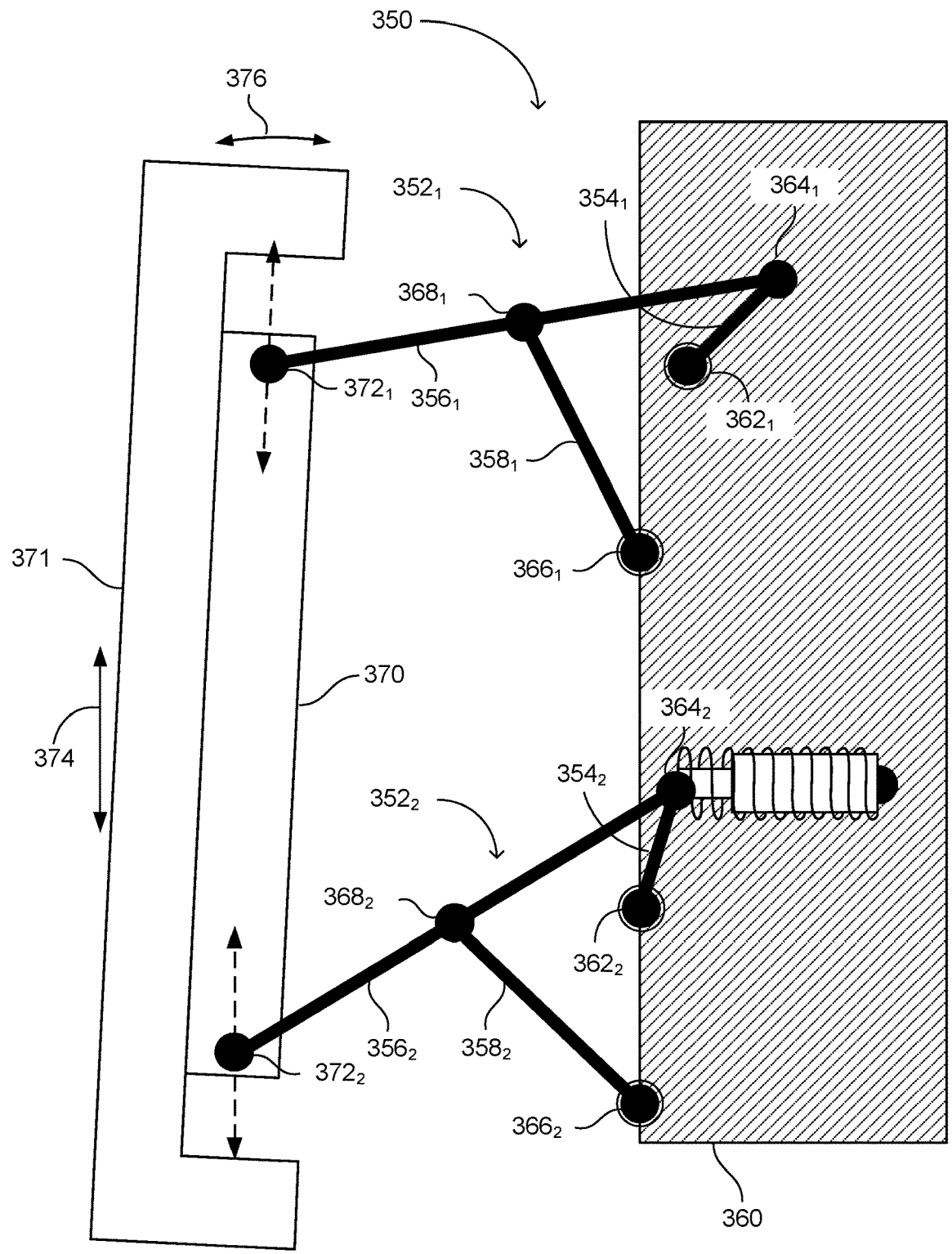

With reference to FIGS. 7C and 7D, Chebyshev-Lambda mechanism $352_1$ is tilted relative to Chebyshev-Lambda mechanism $352_2$, such that the linear motion of operational node $372_1$ is tilted with respect to the linear motion of operational node $372_2$. In such a configuration, the camber angle of wheel 371 changes with vertical motion of wheel 371 (i.e., the camber is dynamic) as indicated by double arrowed arc 376. A dynamic camber affects the dynamics of the vehicle. For example, during a turn, the roll of the vehicle results in vertical motion of the wheel. Thus, during a turn, the surface area of the wheel, which is in contact with the road during the turn, may be maintained or increased. According to another example for achieving a dynamic camber, one of the Chebyshev-Lambda mechanisms operates in the non-linear range thereof.

Figure 8:
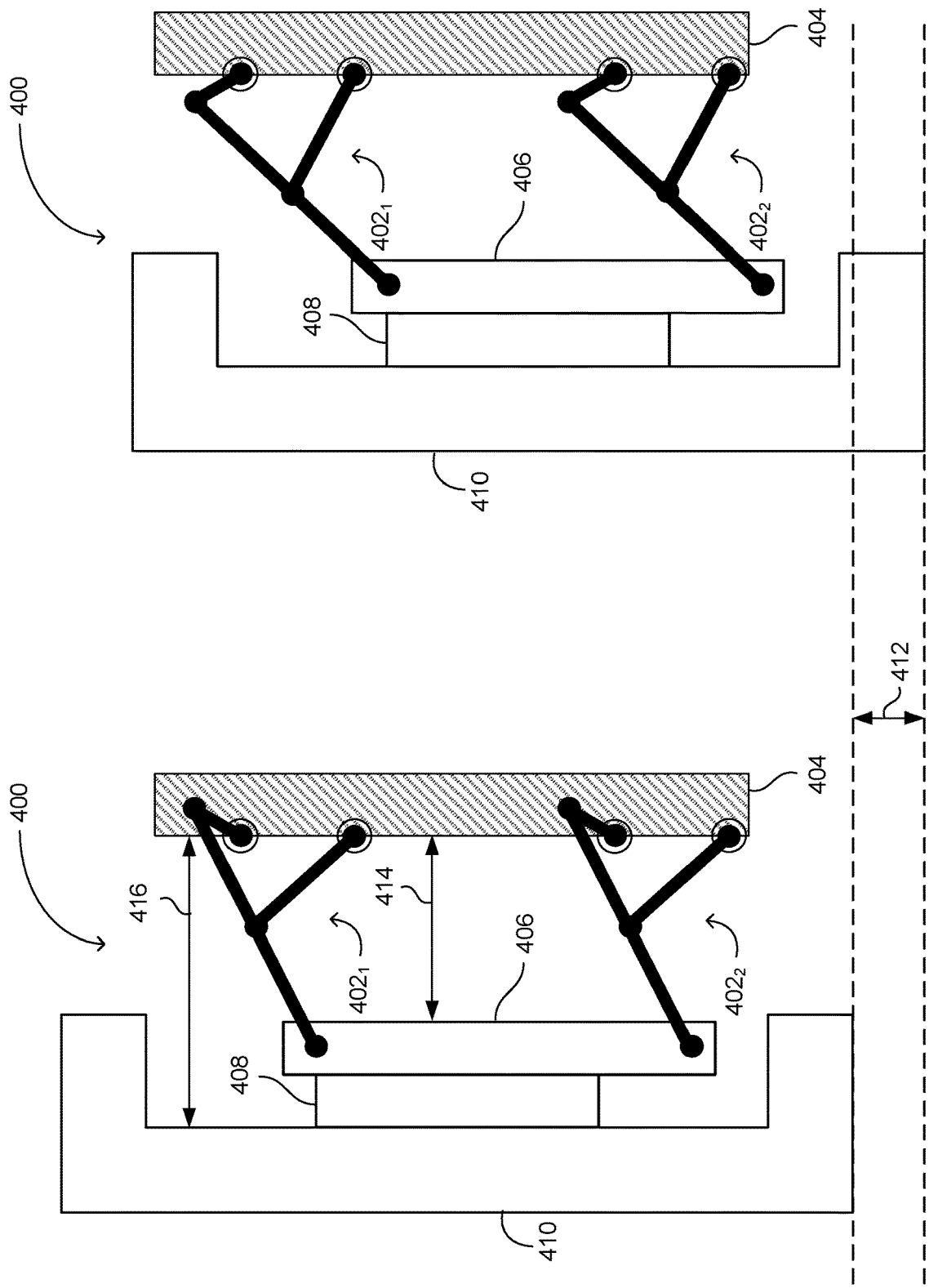
FIG. 8, which is a schematic illustration of a suspension system, constructed and operative in accordance with a further embodiment of the disclosed technique.

Reference is now made to FIG. 8, which is a schematic illustration of a suspension system, generally referenced 400, constructed and operative in accordance with a further embodiment of the disclosed technique. The description of suspension system 350 brought herein in conjunction with FIG. 8 relates to aspects of the disclosed technique which apply to any of the embodiments described herein above in conjunction with FIGS. 1A-1D, 2A-2D, 3A-3E, 4A-4D, 5A-5B, 6A-6B, 7, 9, 10 11 or 12. Suspension system 400 includes two Chebyshev-Lambda mechanisms, first Chebyshev-Lambda mechanism $402_1$ and second Chebyshev-Lambda mechanism $402_2$. Each one of first Chebyshev-Lambda mechanism $402_1$ and second Chebyshev-Lambda mechanism $402_2$ is coupled with reference frame 404 attached to a reference frame 404. Similar to as described above, reference frame 404 is, for example, a chassis of a vehicle, or a frame of an assembly attachable to a chassis. Also, the operational ends of each one of first Chebyshev-Lambda mechanism $402_1$ and second Chebyshev-Lambda mechanism $402_2$ is coupled with a suspended mount 406. A wheel 410 is coupled with suspended mount via a wheel interface 408 (e.g., wheel hub, a hub bearing).

The motion action distance, Dv, of suspension system 400 (i.e., the distance between the extreme positions of wheel 410 in the vertical axis) is designated by double headed arrow 412 in FIG. 8. The dimension of the respective rotating arms of first Chebyshev-Lambda mechanism $402_1$ and second Chebyshev-Lambda mechanism $402_2$, and consequently of the respective suspension arms and support arms are selected to provide a desired value of Dv. Furthermore, the dimension of the respective rotating arms of first Chebyshev-Lambda mechanism $402_1$ and second Chebyshev-Lambda mechanism $402_2$ are selected such that the lateral distance between reference frame 404 and suspended mount 406, as indicated by double headed arrow 414 is within a predetermined range during the action motion of wheel 410. Similarly, the dimension of the respective rotating arms of first Chebyshev-Lambda mechanism $402_1$ and second Chebyshev-Lambda mechanism $402_2$ are selected such that the lateral distance between reference frame 404 and wheel 410, as indicated by double headed arrow 416, is within a predetermined range during the action motion of wheel 410.

In the examples brought forth herein above, the Chebyshev-Lambda mechanisms employed in a suspension system according to the disclosed technique are depicted in a "down-outward orientation". In the down-outward orientation, the suspension arm is positioned above the support arm relative to the horizontal plane, the operational end of the suspension arm is coupled with the suspended mount, and the rotating arm and the support arm are coupled with the frame, as described above. However, any one of Chebyshev-Lambda mechanisms may alternatively be in an "up-outward orientation", a "down-inward orientation" or and "up-inward orientation". In the up-outward orientation, the suspension arm is positioned below the support arm relative to the horizontal plane, the operational end of the suspension arm is coupled with the suspended mount, and the rotating arm and the support arm are coupled with the frame. In the down-inward orientation, the suspension arm is positioned below the support arm relative to the horizontal plane, the operational end of the suspension arm is coupled with the frame, and the rotating arm and the support arm are coupled with the suspended mount. In the up-inward orientation, the suspension arm is positioned above the support arm relative to the horizontal plane, the operational end of the suspension arm is coupled with the frame, and the rotating arm and the support arm are coupled with the suspended mount.

Figure 9:
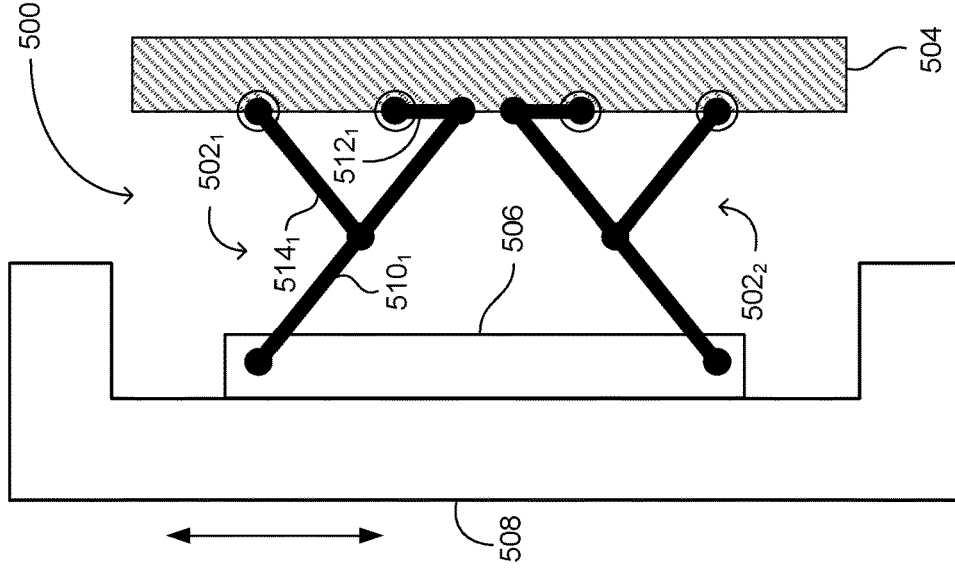
FIG. 9 is a schematic illustration of a suspension system, constructed and operative in accordance with another embodiment of the disclosed technique.

Reference is now made to FIG. 9, which is a schematic illustration of a suspension system, generally referenced 500, constructed and operative in accordance with another embodiment of the disclosed technique. Suspension system 500 includes two Chebyshev-Lambda mechanisms, Chebyshev-Lambda mechanism $502_1$ and Chebyshev-Lambda mechanism $502_2$. Each one of Chebyshev-Lambda mechanism $502_1$ and Chebyshev-Lambda mechanism $502_2$ is similar in operation and construction to any one of the Chebyshev-Lambda mechanisms described above in conjunction with FIGS. 1A-1D, 2A-2D, 3A-3E, 4A-4D, 5A-5B, 6A-6B, 7 and 8. In FIG. 9, depict suspension system $502_1$ in the up-outward orientation. In the up-outward orientation, the suspension arm $510_1$ is positioned below the support arm $514_1$ relative to the horizontal plane 516. The operational end of suspension arm $510_1$ is coupled with the suspended mount 506 and the rotating arm $512_1$ and support arm $514_1$ are coupled with the frame 504 as described above.

Figure 10:
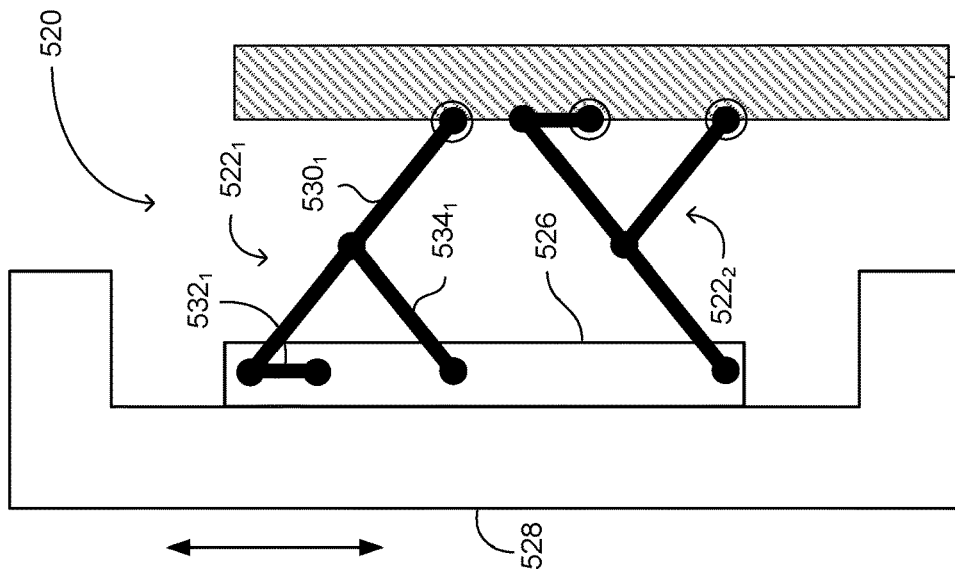
FIG. 10 is a schematic illustration of a suspension system constructed and operative in accordance with a further embodiment of the disclosed technique.

Reference is now made to FIG. 10, which is a schematic illustration of a suspension system, generally referenced 520, constructed and operative in accordance with a further embodiment of the disclosed technique. Suspension system 520 includes two Chebyshev-Lambda mechanisms, Chebyshev-Lambda mechanism $522_1$ and Chebyshev-Lambda mechanism $522_2$. Each one of Chebyshev-Lambda mechanism $522_1$ and Chebyshev-Lambda mechanism $522_2$ is similar in operation and construction to any one of the Chebyshev-Lambda mechanisms described above in conjunction with FIGS. 1A-1D, 2A-2D, 3A-3E, 4A-4D, 5A-5B, 6A-6B, 7 and 8. FIG. 10 depicts Chebyshev-Lambda mechanism $522_1$ in the down-inward orientation. In the down-inward orientation, the suspension arm $530_1$ is positioned above the support arm $534_1$ relative to the horizontal plane 536. The operational end of suspension arm $530_1$ is coupled with the frame 524. The rotating arm $532_1$ and support arm $534_1$ are coupled with the suspended mount 526.

Figure 11:
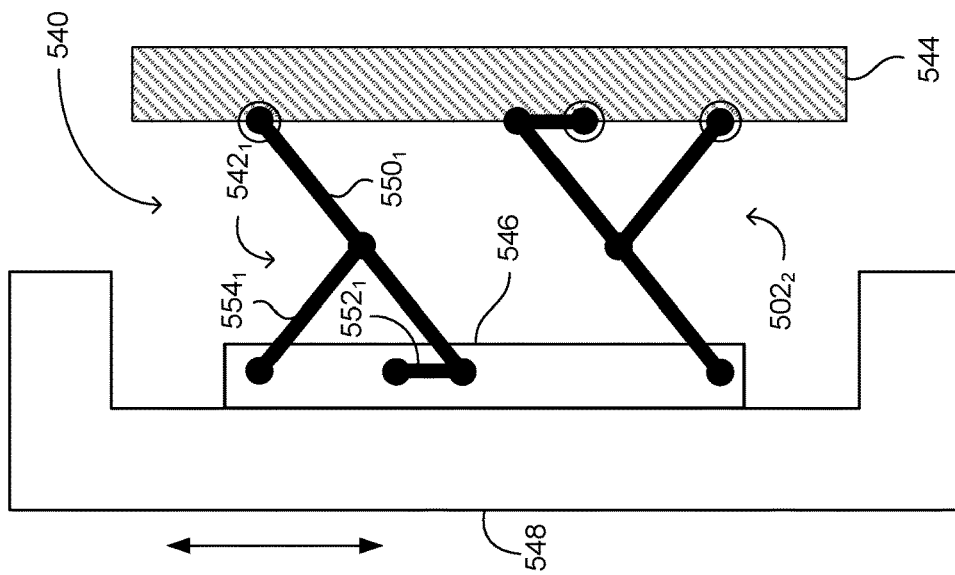
FIG. 11 is a schematic illustration of a suspension system constructed and operative in accordance with another embodiment of the disclosed technique.

Reference is now made to FIG. 11, which is a schematic illustration of a suspension system, generally referenced 540, constructed and operative in accordance with another embodiment of the disclosed technique. Suspension system 540 includes two Chebyshev-Lambda mechanisms, Chebyshev-Lambda mechanism $542_1$ and Chebyshev-Lambda mechanism $542_2$. Each one of Chebyshev-Lambda mechanism $542_1$ and Chebyshev-Lambda mechanism $542_2$ is similar in operation and construction to any one of the Chebyshev-Lambda mechanisms described above in conjunction with FIGS. 1A-1D, 2A-2D, 3A-3E, 4A-4D, 5A-5B, 6A-6B, 7 and 8. FIG. 11 depicts Chebyshev-Lambda mechanism $542_1$ in the up-inward orientation. In the up-inward orientation, the suspension arm $550_1$ is positioned below the support arm $554_1$ relative to the horizontal plane 556. The operational end of suspension arm $550_1$ is coupled with the frame 544. The rotating arm $552_1$ and support arm $554_1$ are coupled with the suspended mount 546.

Similar to as mentioned above, and with reference to FIGS. 9, 10 and 11, any one of Chebyshev-Lambda mechanisms, $502_2$ $522_2$ $542_2$ may also be in any one of the up-outward orientation, a down-inward orientation or up-inward orientation. Also, any one of Chebyshev-Lambda mechanisms, $502_1$, $522_1$, $542_1$, $502_2$, $522_2$ and $542_2$ may be tilted as described above in conjunction with FIGS. 7C and 7D. Also, any one of Chebyshev-Lambda mechanisms, $502_1$, $522_1$, $542_1$ exhibit different dimensions with respect to Chebyshev-Lambda mechanisms $502_2$, $522_2$ and $542_2$, as described above in conjunction with FIG. 7A.

Figure 12:
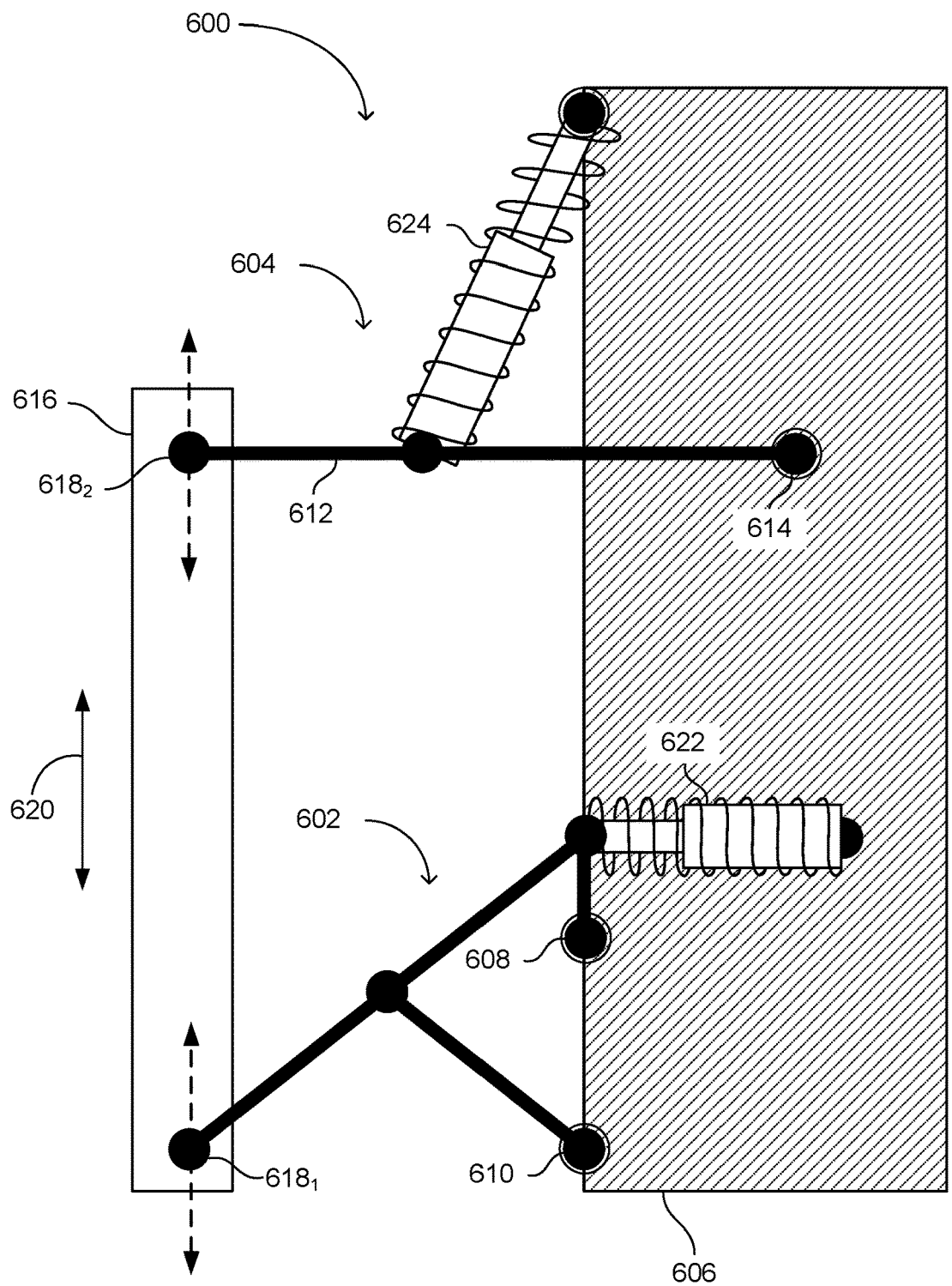
FIG. 12 is a schematic illustration of a suspension system constructed and operative in accordance with a further embodiment of the disclosed technique.

In the description above, a suspension system according to the disclosed technique includes two Chebyshev-Lambda mechanisms. In general, a suspension system according to the disclose technique include at least one Chebyshev-Lambda mechanism and at least one linear motion mechanism. Reference is now made to FIG. 12, which is a schematic illustration of a suspension system, generally referenced 600, constructed and operative in accordance with a further embodiment of the disclosed technique. The description of suspension system 600 brought herein in conjunction with FIG. 12 relates to aspects of the disclosed technique which apply to any of the embodiments described herein above in conjunction with FIGS. 1A-1D, 2A-2D, 3A-3E, 4A-4D, 5A-5B, 6A-6B, 7, 8, 9, 10 or 11.

Suspension system 600 includes a Chebyshev-Lambda mechanism 602 and a linear motion mechanism 604 attached to a reference frame 606. Similar to as described above, reference frame 606 is, for example, a chassis of a vehicle, or a frame of an assembly attachable to a chassis. In FIG. 12, linear motion mechanism 604 is embodied as arm mechanism which includes arm 612. Chebyshev-Lambda mechanism 602 is coupled with reference frame 606 at rotating arm anchoring node 608 and support anchoring node 610 (i.e., anchoring nodes indicated by double circles). Linear motion mechanism 604 is coupled with reference frame 606 at a second anchoring node 614. An operational end of Chebyshev-Lambda mechanism 602 is rotatably coupled with a suspended mount 616, at operational node 6181. An operational end linear motion mechanism 604 is rotatably coupled with a suspended mount 616 at operational node 6182. The other end of linear motion mechanism 604 is rotatably coupled with reference frame 606. Thus, suspended mount 616 is free to move along the vertical axis, as indicated by arrow 620, and relative to reference frame 606. Suspension system 600 further includes two spring-damper assemblies, spring-damper 622 and spring-damper 624. One end of spring-damper 622 is rotatably coupled with the rotating arm motion node of Chebyshev-Lambda mechanism 602 and the other end of spring-damper mechanism 622 is rotatably coupled with reference frame 606. One end of spring-damper 624 is rotatably coupled with arm 612 at a suspension node, and the other end of spring-damper mechanism 624 is rotatably coupled with reference frame 606. Thus, any vertical motion of suspended mount 620, and thus of the operational end of Chebyshev-Lambda mechanism 602 and linear motion mechanism 604 is transferred to spring-dampers 622 and 624, which reduces the shocks and impacts transferred to reference frame 606 from the wheel. It is noted that the two spring-damper in FIG. 12 (i.e., spring-damper 622 and spring-damper 624) are described as an example only. Similar to as mentioned above, suspension system 600 includes at least one spring-damper assembly connected at respective points, where the ends of each spring and damper are be coupled between two points that the distance therebetween changes during the motion action of the wheel, for example, as described above in conjunction with FIGS. 3A-3E.

A wheel assembly according to the disclosed technique described herein above includes a suspension system, such as any of the suspension systems described hereinabove. The wheel assembly according to the disclosed technique described herein above includes the wheel assembly frame, configured to be attached to a vehicle platform/chassis (e.g., at the wheel corner thereof).

A "corner assembly" as described herein means an assembly for supporting a wheel of a vehicle and regulating the motion of a vehicle according to any of the embodiments disclosed herein. The corner assembly can include components such as steering systems, suspension systems, braking systems (including hydraulic sub-systems), gearing assemblies, drive motors, drive shafts, wheel hub assemblies, controllers, communications arrangements, electrical wiring and the like, as is known in the field.

According to the disclosed technique, the wheel assembly and/or corner assembly is motorized and includes a drivetrain assembly. The drivetrain assembly includes, for example, a motor and may further include rotatable drivetrain shaft, coupled with the motor and the wheel, and passing between the Chebyshev-Lambda mechanisms. The rotatable drivetrain shaft is coupled with the wheel, for example, with a constant-velocity (CV) joint. In operation the motor rotates rotatable drivetrain shaft which transmit rotations generated by the motor to the wheel. Optionally, drivetrain assembly may further include one or more gears (e.g., planetary gears).

The above description of the disclosed technique related to a vehicle or vehicles in which the surface contact element (i.e., the element in contact with the surface over which the vehicle moves) is a wheel. However, the surface contact element may alternatively or additionally be, for example, skis or caterpillar tracks. As such, the term "wheel" is a special case of a surface contact element and the term "suspended mount" is a special case of a "the surface contact element suspended mount". Suspended mount for a wheeled vehicle may include a wheel interface, a wheel hub, a wheel bearing and the like. Also, a vehicle according to the disclosed technique may be a car, a motorcycle, a tricycle, an All Terrain Vehicle (ATV), a train, an aircraft, a trailer, a truck, a toy vehicle, an amphibian, a tank, a tractor, a compactor or a roller. A vehicle or vehicles may include two or more the surface contact elements and, as such, include two or more respective suspension systems, such as those described hereinabove. Also, for the sake of example only, a wheel in a car exhibits a rim diameter of 15-17 inches. The motion action of a suspension system employed with a wheel and a car shall be between 100-300 mm.

It will be appreciated by persons skilled in the art that the disclosed technique is not limited to what has been particularly shown and described hereinabove. Rather the scope of the disclosed technique is defined only by the claims, which follow.

The invention claimed is:

1. A suspension system, comprising:
   a Chebyshev-Lambda mechanism, including a suspension-arm, a support-arm and a first rotating-arm, a rotating-arm-anchoring-end of said rotating-arm is configured to be rotatably coupled with a reference frame at a rotating-arm-anchoring-node, an operational-end of said suspension-arm is configured to be rotatably coupled with a surface-contact-element-suspended-mount at a first operational-node, a support-arm-anchoring-end of said support-arm is configured to be rotatably coupled with said reference frame at a support-anchoring-node;
   at least one linear motion mechanism, configured to be coupled with said reference frame via at least one anchoring node, an operational end of said at least one linear motion mechanism is configured to be rotatably coupled with said surface-contact-element-suspended-mount at a second operational-node; and
   a spring-damper assembly, said spring-damper assembly including at least one spring and at least one damper, wherein respective first and second ends of each of said at least one spring and at least one damper are coupled between two points, where the distance between said two points changes during the motion action of said surface-contact-element.

2. The suspension system according to claim 1, wherein said rotating-arm-anchoring-node is fixed in said reference frame, a rotating-arm-motion end of said rotating-arm is rotatably coupled with a suspension-arm-motion end of said suspension arm at a rotating node, a location of said support anchoring node is fixed in said reference frame, a support arm motion end of said support arm is rotatably coupled with said suspension arm at a support node.

3. The suspension system according to claim 1, wherein said first end of said spring-damper assembly is coupled with said reference frame and said second end of said spring-damper assembly is coupled with one of said Chebyshev-Lambda mechanism and said at least one linear motion mechanism, at respective pivot points.

4. The suspension system according to claim 1, wherein said at least one linear motion mechanism is at least a second Chebyshev-Lambda mechanism, arranged vertically with respect to said Chebyshev-Lambda mechanism, said second Chebyshev-Lambda mechanism including a second suspension-arm, a second support-arm, and a second-rotating arm, a rotating-arm-anchoring-end of said second rotating-arm is configured to be rotatably coupled with said reference frame at a second rotating-arm-anchoring-node, an operational-end of said second suspension-arm is configured to be rotatably coupled with said surface contact element suspended mount at a second operational-node, a support-armanchoring-end of said second support-arm is configured to be rotatably coupled with said reference frame at a second support-anchoring-node.

5. The suspension system according to claim 4, wherein a location of said second rotating arm anchoring node is fixed in said reference frame, a rotating arm motion end of said second rotating arm is rotatably coupled with a suspension arm motion end of said second suspension arm at a second rotating node, a location of said second support anchoring node is fixed in said reference frame, a support arm motion end of said second support arm is rotatably coupled with said second suspension arm at a second support node.

6. The suspension system according to claim 4, wherein said Chebyshev-Lambda mechanism and said at least said second Chebyshev-Lambda mechanism exhibit different dimensions one with respect to the other.

7. The suspension system according to claim 4, wherein one of said Chebyshev-Lambda mechanism and said at least said second Chebyshev-Lambda mechanism is tilted with respect to the other one of said Chebyshev-Lambda mechanism and said at least said second Chebyshev-Lambda mechanism.

8. The suspension system according to claim 4, wherein each one of said Chebyshev-Lambda mechanism and said at least said second Chebyshev-Lambda mechanism is in one of a down-outward orientation, an up-outward orientation, a down-inward orientation and an up-inward orientation.

9. The suspension system according to claim 4, wherein one of said Chebyshev-Lambda mechanism and said at least said second Chebyshev-Lambda mechanism operates in a non-linear range thereof and the other one of said Chebyshev-Lambda mechanism and said at least said second Chebyshev-Lambda mechanism operates in a linear range thereof.

10. The suspension system according to claim 4, wherein both said Chebyshev-Lambda mechanism and said at least said second Chebyshev-Lambda mechanism operate in a linear range thereof.

11. The suspension system according to claim 1, wherein said second ends of said spring-damper assembly are coupled with one of said Chebyshev-Lambda mechanism and said at least one linear motion mechanism via a rocker and a pushrod.

12. The suspension system according to claim 1, further including a steering compensation mechanism, said steering compensation mechanism including a steering actuator rocker, coupled with one of said Chebyshev-Lambda mechanism and said at least one linear motion mechanism via a steering pushrod, vertical motion of said surface contact element suspended mount is transferred via said steering pushrod to said steering actuator rocker, causing said steering actuator rocker to rotate about an actuator pivot point, thus maintaining a lateral distance between a reference frame and a steering arm rotating node, said steering arm rotating node located on said surface contact element suspended mount.

13. The suspension system according to claim 1, wherein said reference frame is a wheel assembly frame of a wheel assembly, said wheel assembly configured to be attached to a chassis of a vehicle.

14. A corner assembly comprising the suspension system according to claim 1, said corner assembly further comprising said surface-contact-element-suspended-mount.

15. A vehicle, comprising at least two corner assemblies according to claim 14, wherein a wheel is coupled with each of said at least two corner assemblies.

16. A vehicle comprising at least two suspension systems according to claim 1, wherein a wheel is mounted on each of said at least two suspension systems.

17. The suspension system according to claim 1, wherein said reference frame is a chassis of a vehicle.

18. A vehicle comprising the suspension system according to claim 1, wherein said suspension system is coupled with a chassis of said vehicle.

19. A suspension system comprising:
a first Chebyshev-Lambda mechanism and a second Chebyshev-Lambda mechanism, each of said first Chebyshev-Lambda mechanism and said second Chebyshev-Lambda mechanism includes a respective suspension-arm, a respective support-arm and a respective rotating-arm, a rotating-arm-anchoring-end of each of said respective rotating-arm is configured to be rotatably coupled with a reference frame at a respective rotating-arm-anchoring-node, an operational-end of each said respective suspension-arm is configured to be rotatably coupled with a surface-contact-element-suspended-mount at a respective operational-node of the same surface-contact-element-suspended-mount, a support-arm-anchoring-end of each said respective support-arm is configured to be rotatably coupled with said reference frame at a respective support-anchoring-node; and
a spring-damper assembly, said spring-damper assembly including at least one spring and at least one damper, the ends of each of said at least one spring and at least one damper are coupled between two points, where the distance between said two points changes during the motion action of said surface-contact-element-suspended mount.

* * * * *